US012626599B2

(12) United States Patent
Komiyama

(10) Patent No.: US 12,626,599 B2
(45) Date of Patent: May 12, 2026

(54) INFORMATION SYSTEM, MANAGEMENT DEVICE AND EDGE DEVICE

(71) Applicant: DENSO CORPORATION, Kariya (JP)

(72) Inventor: Masatoshi Komiyama, Kariya (JP)

(73) Assignee: DENSO CORPORATION, Kariya-city (JP)

( * ) Notice: Subject to any disclaimer, the term of this patent is extended or adjusted under 35 U.S.C. 154(b) by 547 days.

(21) Appl. No.: 18/079,091

(22) Filed: Dec. 12, 2022

(65) Prior Publication Data

US 2023/0230486 A1 Jul. 20, 2023

(30) Foreign Application Priority Data

Jan. 18, 2022 (JP) ................................ 2022-005646

(51) Int. Cl.
*G08G 1/00* (2006.01)
*G08G 1/01* (2006.01)

(52) U.S. Cl.
CPC ........... *G08G 1/207* (2013.01); *G08G 1/0112* (2013.01)

(58) Field of Classification Search
CPC ............................ G08G 1/207; G08G 1/0112
USPC .......................................................... 701/117
See application file for complete search history.

(56) References Cited

U.S. PATENT DOCUMENTS 8,626,344 B2 * 1/2014 Imes ........................ F24F 11/30 455/419
8,653,956 B2 * 2/2014 Berkobin ............... G08G 1/207 340/426.22
12,373,892 B1 * 7/2025 Brannan ............... H04W 4/021
2008/0174485 A1 * 7/2008 Carani ................... G06Q 10/08 342/357.46
2014/0351328 A1 * 11/2014 Woods .................. H04W 4/021 709/204
2016/0096402 A1 * 4/2016 Carlin ................. B60C 23/0479 340/442
2017/0023377 A1 * 1/2017 Burtner .............. G08B 13/2462

(Continued)

FOREIGN PATENT DOCUMENTS

CN 110741422 A * 1/2020 ........... B60R 16/037
JP 2010-200123 A 9/2010

OTHER PUBLICATIONS

Amster, Haley, and Brett Diehl. "Against Geofences." Stanford law review 74.2 (2022): 385-445. Print. (Year: 2022).*

*Primary Examiner* — Erin D Bishop
*Assistant Examiner* — Keith A von Volkenburg
(74) *Attorney, Agent, or Firm* — Harness, Dickey & Pierce, P.L.C.

(57) ABSTRACT

An information system includes: a management device including a first management unit and a second management unit; and an edge device. The first management unit includes a storage unit that is configured to store, in association with the registered vehicle, vehicle data repeatedly provided from the edge device. The second management unit includes: a geofence setting unit that sets a geofence including a current position of the registered vehicle; a determination unit that determines whether the registered vehicle moves out of the geofence; and a notification transmission unit that transmits a notification indicating that the registered vehicle has moved out of the geofence to a terminal device associated with the registered vehicle when the determination unit determines that the registered vehicle has moved out of the geofence.

11 Claims, 18 Drawing Sheets

(56) References Cited

U.S. PATENT DOCUMENTS

| | | | | |
|---|---|---|---|---|
| 2017/0199046 | A1* | 7/2017 | Lee | G01C 21/3697 |
| 2019/0246078 | A1* | 8/2019 | Araya | G07C 5/0866 |
| 2019/0258990 | A1* | 8/2019 | Makita | G06Q 10/00 |
| 2020/0109527 | A1* | 4/2020 | McAlpine | E01C 19/23 |
| 2020/0242862 | A1* | 7/2020 | Cate | G07C 9/00896 |
| 2020/0409929 | A1* | 12/2020 | Kodavarti | G06F 16/2365 |
| 2021/0092551 | A1* | 3/2021 | Millington | H04W 4/029 |
| 2021/0099828 | A1* | 4/2021 | Hanna | H04W 4/021 |
| 2021/0155230 | A1* | 5/2021 | Brown | B61L 15/0072 |
| 2021/0218753 | A1* | 7/2021 | Zhao | H04L 9/3268 |
| 2021/0302621 | A1* | 9/2021 | Brown | H04Q 9/00 |
| 2022/0383728 | A1* | 12/2022 | Brown | G08B 25/08 |
| 2023/0115478 | A1* | 4/2023 | Shin | H04N 13/271<br>348/43 |

* cited by examiner

DATA FORMAT

| UNIQUE LABEL | ECU | DATA | | | |
|---|---|---|---|---|---|
| | | TYPE | SIZE | VALUE | UNIT |
| ETHA | ENG | float | 4byte | 25.0 | °C |
| NE1 | ENG | float | 4byte | 3000 | rpm |
| ... | | | | | |

FIG. 10

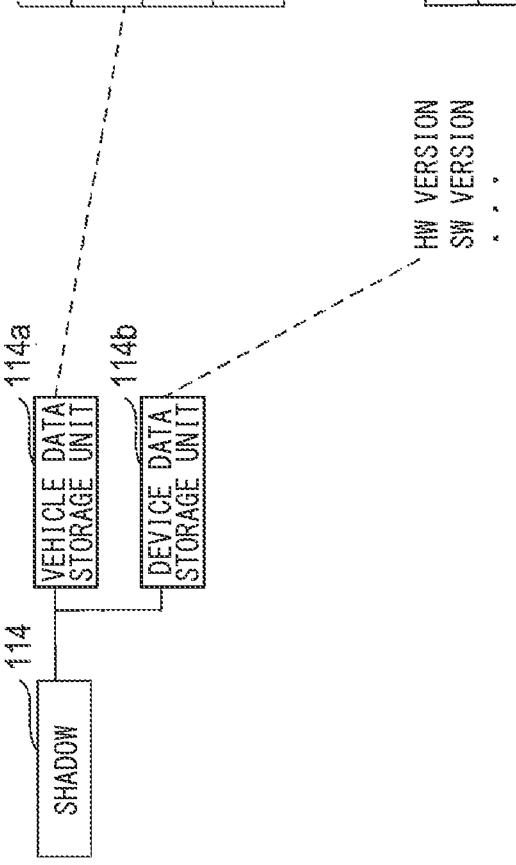

| PHYSICAL NAME | ITEM NAME | DATA TYPE |
|---|---|---|
| object-id | OBJECT ID | CHARACTER STRING |
| Shadow_version | SHADOW VERSION | NUMERICAL VALUE |
| mobility-data | DATA DEFINITION | CHARACTER STRING |

| PHYSICAL NAME | ITEM NAME | DATA TYPE |
|---|---|---|
| object-id | OBJECT ID | CHARACTER STRING |
| update_time | UPDATE TIME | NUMERICAL VALUE |
| version | VERSION | CHARACTER STRING |
| power_status | SYSTEM STATUS | CHARACTER STRING |
| power_status_timestamp | SYSTEM STATUS NOTIFICATION TIME STAMP | NUMERICAL VALUE |
| notify_reason | RESULT REASON | CHARACTER STRING |

FIG. 11

118

| ITEM NAME | DATA OVERVIEW |
|---|---|
| gateway-id | GATEWAY ID |
| object-id | OBJECT ID |
| shadow-version | SHADOW VERSION |
| vin | VEHICLE ID |
| location-lon | VEHICLE LATITUDE |
| location-lat | VEHICLE LONGITUDE |
| location-alt | VEHICLE ALTITUDE |

FIG. 12

126

| FIELD NAME | ITEM NAME | FORMAT |
|---|---|---|
| timestamp | TIME | long |
| schedule-type | SCHEDULE TYPE | keyword |
| gateway-id | GATEWAY ID | keyword |
| object-id | OBJECT ID | keyword |
| shadow-version | TIME (GW) | long |
| vin | VEHICLE ID | keyword |
| location | LOCATION | geo_point |
| alt | ALTITUDE | float |

INFORMATION SYSTEM, MANAGEMENT DEVICE AND EDGE DEVICE

CROSS REFERENCE TO RELATED APPLICATIONS

This application is based on and incorporates herein by reference Japanese Patent Application No. 2022-005646 filed on Jan. 18, 2022.

TECHNICAL FIELD

The present disclosure relates to a technology for effectively using resources of a connected car.

BACKGROUND ART

There has been known a technology for connecting a vehicle to a cloud server or the like on a network and uploading and downloading various types of data between the vehicle and the cloud.

SUMMARY

In one aspect of the present disclosure, an information system includes: a management device including a first management unit and a second management unit; and an edge device mounted in a registered vehicle registered in the second management unit. The edge device includes: a data providing unit that is configured to repeatedly collect vehicle data including position information of the registered vehicle and a state of the registered vehicle and provide the vehicle data to the first management unit; and an event transmission unit that is configured to detect occurrence of a preset event and transmit an event notification indicative of the occurrence of the event to the second management unit. The first management unit includes a storage unit that is configured to store, in association with the registered vehicle, the vehicle data repeatedly provided from the edge device. The second management unit includes: a data acquisition unit that is configured to acquire the vehicle data stored in the storage unit; a receiving unit that is configured to receive the event notification transmitted from the event transmission unit; a geofence setting unit that is configured to set a geofence including a current position of the registered vehicle in response to the receiving unit receiving the event notification; a position identification unit that is configured to repeatedly identify the current position of the registered vehicle based on the vehicle data acquired by the data acquisition unit; a determination unit that is configured to determine whether the registered vehicle moves out of the geofence set by the geofence setting unit based on the current position identified by the position identification unit; and a notification transmission unit that is configured to transmit a notification indicating that the registered vehicle has moved out of the geofence to a terminal device associated with the registered vehicle when the determination unit determines that the registered vehicle has moved out of the geofence.

BRIEF DESCRIPTION OF DRAWINGS

FIG. 10 is a diagram showing a configuration of a shadow.

FIG. 11 is a diagram showing a configuration of a latest index.

FIG. 12 is a diagram showing a configuration of an index.

DESCRIPTION OF EMBODIMENTS

Figure 1:
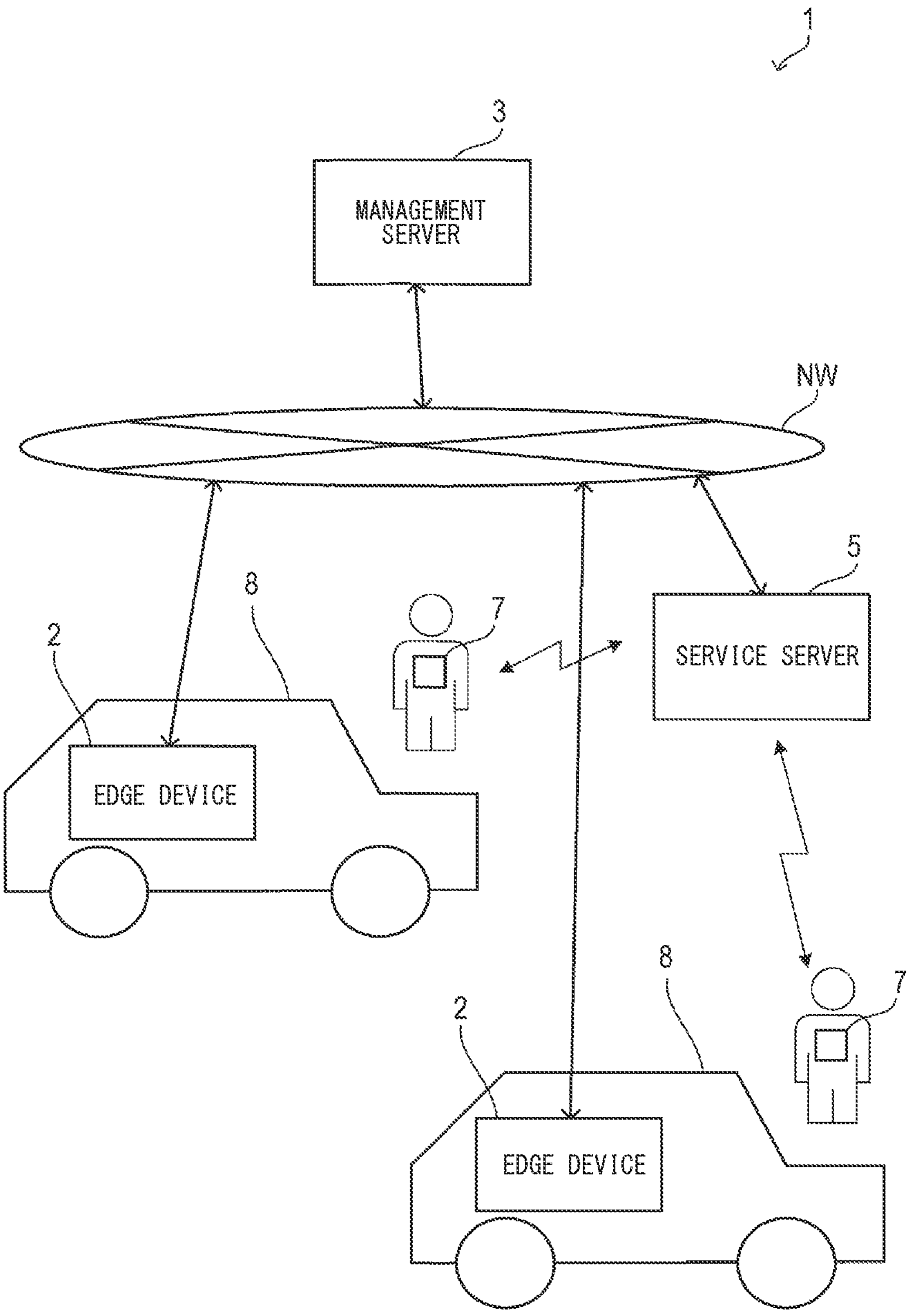
FIG. 1 is a schematic diagram showing a configuration of a mobility IoT system.

To begin with, a relevant technology will be described first only for understanding the following embodiments.

Fleet services are provided using a connected technology for commercial vehicles and include services such as vehicle tracking, business management, driver management, regulatory compliance, and cost reduction.

Some fleet services are based on the premise that the vehicle will be used by another person. A user may have various concerns regarding the use of the vehicle by another person.

One aspect of the present disclosure provides a technology for alleviating a user's concern about the use of a vehicle by another person.

According to a first aspect of the present disclosure, an information system includes: a management device including a first management unit and a second management unit; and an edge device mounted in a registered vehicle registered in the second management unit. The edge device includes: a data providing unit that is configured to repeatedly collect vehicle data including position information of the registered vehicle and a state of the registered vehicle and provide the vehicle data to the first management unit; and an event transmission unit that is configured to detect occurrence of a preset event and transmit an event notification indicative of the occurrence of the event to the second management unit. The first management unit includes a storage unit that is configured to store, in association with the registered vehicle, the vehicle data repeatedly provided from the edge device. The second management unit includes: a data acquisition unit that is configured to acquire the vehicle data stored in the storage unit; a receiving unit that is configured to receive the event notification transmitted from the event transmission unit; a geofence setting unit that is configured to set a geofence including a current position of the registered vehicle in response to the receiving unit receiving the event notification; a position identification unit that is configured to repeatedly identify the current position of the registered vehicle based on the vehicle data acquired by the data acquisition unit; a determination unit that is configured to determine whether the registered vehicle moves out of the geofence set by the geofence setting unit based on the current position identified by the position identification unit; and a notification transmission unit that is configured to transmit a notification indicating that the registered vehicle has moved out of the geofence to a terminal device associated with the registered vehicle when the determination unit determines that the registered vehicle has moved out of the geofence.

In the information system according to the first aspect of the present disclosure, when a preset event occurs and it is determined that the registered vehicle has moved out of the geofence, a notification is transmitted to the terminal device associated with the registered vehicle. Therefore, even when the vehicle is used by another person, the user can immediately recognize the use of the vehicle by another person. Therefore, the user's concern about the use of the vehicle by another person can be alleviated.

According to a second aspect of the present disclosure, an information system includes: a management device including a first management unit and a second management unit; and an edge device mounted in a registered vehicle registered in the second management unit. The edge device includes: a data providing unit that is configured to repeatedly collect vehicle data including position information of the registered vehicle and a state of the registered vehicle and provide the vehicle data to the first management unit; and an event transmission unit that is configured to detect occurrence of a preset event and transmit an event notification indicative of the occurrence of the event to the second management unit. The first management unit includes: a storage unit that is configured to store, in association with the registered vehicle, the vehicle data repeatedly provided from the edge device; and a vehicle control unit that is configured to control the registered vehicle to perform instructed vehicle control. The second management unit includes: a data acquisition unit that is configured to acquire the vehicle data stored in the storage unit; a receiving unit that is configured to receive the event notification transmitted from the event transmission unit; a geofence setting unit that is configured to set a geofence including a current position of the registered vehicle in response to the receiving unit receiving the event notification; a position identification unit that is configured to repeatedly identify the current position of the registered vehicle based on the vehicle data acquired by the data acquisition unit; a determination unit that is configured to determine whether the registered vehicle moves out of the geofence set by the geofence setting unit based on the current position identified by the position identification unit; and a control instruction unit that is configured to instruct the vehicle control unit to perform predetermined vehicle control for the registered vehicle when the determination unit determines that the registered vehicle has moved out of the geofence.

In the information system according to the second aspect of the present disclosure, when a preset event occurs and it is determined that the registered vehicle has moved out of the geofence, the predetermined vehicle control for the registered vehicle is instructed. Therefore, even when the vehicle is used by another person, the user can keep the vehicle under control. Therefore, the user's concern about the use of the vehicle by another person can be alleviated.

According to a third aspect of the present disclosure, a management device includes: a first management unit; and a second management unit. The management device constitutes an information system together with an edge device mounted in a registered vehicle registered in the second management unit. The first management unit includes a storage unit that is configured to store, in association with the registered vehicle, vehicle data including position information repeatedly provided from the edge device. The second management unit includes: a data acquisition unit that is configured to acquire the vehicle data stored in the storage unit; a receiving unit that is configured to receive an event notification that is indicative of occurrence of a preset event and is transmitted from the edge device; a geofence setting unit that is configured to set a geofence including a current position of the registered vehicle in response to the receiving unit receiving the event notification; a position identification unit that is configured to repeatedly identify the current position of the registered vehicle based on the vehicle data acquired by the data acquisition unit; a determination unit that is configured to determine whether the registered vehicle moves out of the geofence set by the geofence setting unit based on the current position identified by the position identification unit; and a notification transmission unit that is configured to transmit a notification indicating that the registered vehicle has moved out of the geofence to a terminal device associated with the registered vehicle when the determination unit determines that the registered vehicle has moved out of the geofence.

With the management device according to the third aspect of the present disclosure, the same effects as those of the information system according to one aspect of the present disclosure can be obtained.

According to a fourth aspect of the present disclosure, a management device includes: a first management unit; and a second management unit. The management device constitutes an information system together with an edge device mounted in a registered vehicle registered in the second management unit. The first management unit includes: a storage unit that is configured to store, in association with the registered vehicle, vehicle data including position information repeatedly provided from the edge device; and a vehicle control unit that is configured to control the registered vehicle to perform instructed vehicle control. The second management unit includes: a data acquisition unit that is configured to acquire the vehicle data stored in the storage unit; a receiving unit that is configured to receive an event notification that is indicative of occurrence of a preset event and is transmitted from the edge device; a geofence setting unit that is configured to set a geofence including a current position of the registered vehicle in response to the receiving unit receiving the event notification; a position identification unit that is configured to repeatedly identify the current position of the registered vehicle based on the vehicle data acquired by the data acquisition unit; a determination unit that is configured to determine whether the registered vehicle moves out of the geofence set by the geofence setting unit based on the current position identified by the position identification unit; and a control instruction unit that is configured to instruct the vehicle control unit to perform predetermined vehicle control for the registered vehicle when the determination unit determines that the registered vehicle has moved out of the geofence.

With the management device according to the fourth aspect of the present disclosure, the same effects as those of the information system according to another aspect of the present disclosure can be obtained.

According to a fifth aspect of the present disclosure, an edge device constitutes an information system together with a management device including a first management unit and a second management unit. The edge device is mounted in a registered vehicle registered in the second management unit. The edge device includes: a data providing unit that is configured to repeatedly collect vehicle data including position information of the registered vehicle and a state of the registered vehicle and provide the vehicle data to the first management unit; a first event transmission unit that is configured to transmit a first event notification to the second management unit in response to detecting occurrence of a preset event; and a second event transmission unit that is configured to transmit a second event notification to the second management unit when a vehicle speed of the registered vehicle increases to be equal to or higher than a threshold after the first event transmission unit transmitted the first event notification.

By the edge device according to the fifth aspect of the present disclosure transmitting the second event notification in addition to the first event notification, the second management unit can more accurately detect use of the vehicle by another person.

According to a sixth aspect of the present disclosure, an information notification method is performed by an information system including a management device and an edge device. The management device includes a first management unit and a second management unit. The edge device is mounted in a registered vehicle registered in the second management unit. The information notification method includes: by the edge device, repeatedly collecting vehicle data including position information of the registered vehicle and a state of the registered vehicle and transmitting the vehicle data to the first management unit; detecting occurrence of a preset event and transmitting an event notification indicative of the occurrence of the event to the second management unit; by the first management unit, storing, in association with the registered vehicle, the vehicle data repeatedly provided from the edge device in a storage unit; by the second management unit, acquiring the vehicle data stored in the storage unit; setting a geofence including a current position of the registered vehicle in response to receiving the event notification; repeatedly identifying the current position of the registered vehicle based on the acquired vehicle data; determining whether the registered vehicle moves out of the set geofence based on the identified current position; and transmitting a notification indicating that the registered vehicle has moved out of the geofence to a terminal device associated with the registered vehicle upon determining that the registered vehicle has moved out of the geofence.

With the information notification method according to the sixth aspect of the present disclosure, the same effects as those of the information system according to one aspect of the present disclosure can be obtained.

According to a seventh aspect of the present disclosure, a vehicle control method is performed by an information system including a management device and an edge device. The management device includes a first management unit and a second management unit. The edge device is mounted in a registered vehicle registered in the second management unit. The vehicle control method includes: by the edge device, repeatedly collecting vehicle data including position information of the registered vehicle and a state of the registered vehicle and providing the vehicle data to the first management unit; detecting occurrence of a preset event and transmitting an event notification indicative of the occurrence of the event to the second management unit; by the first management unit, storing, in association with the registered vehicle, the vehicle data repeatedly provided from the edge device in a storage unit; by the second management unit, acquiring the vehicle data stored in the storage unit; setting a geofence including a current position of the registered vehicle in response to receiving the event notification; repeatedly identifying the current position of the registered vehicle based on the acquired vehicle data; determining whether the registered vehicle moves out of the set geofence based on the identified current position; instructing the first management unit to perform predetermined vehicle control for the registered vehicle upon determining that the registered vehicle has moved out of the geofence; by the first management unit, controlling the registered vehicle to perform the predetermined vehicle control when instructed by the second management unit.

With the vehicle control method according to the seventh aspect of the present disclosure, the same effects as those of the information system according to another aspect of the present disclosure can be obtained.

According to an eighth aspect of the present disclosure, a non-transitory computer readable tangible storage medium stores a program for a processing device of an edge device. The edge device constitutes an information system together with a management device including a first management unit and a second management unit. The edge device is mounted in a registered vehicle registered in the second management unit. The program, when executed by the processing device, causes the processing device to: repeatedly collect vehicle data including position information of the registered vehicle and a state of the registered vehicle and provide the vehicle data to the first management unit; transmit a first event notification to the second management unit in response to detecting occurrence of a preset event; and transmit a second event notification to the second management unit when a vehicle speed of the registered vehicle increases to be equal to or higher than a threshold after the first event notification was transmitted.

By the processing device of the edge device executing the program according to one aspect of the present disclosure, the same effects as those of the edge device of one aspect of the present disclosure can be obtained.

Next, embodiments of the present disclosure will be described below with reference to the drawings.

<1-1. Overall Configuration>

A mobility IoT system 1 shown in FIG. 1 includes multiple edge devices 2, a management server 3, a service server 5, and multiple terminal devices 7. IoT is an abbreviation for Internet of Things. The management server 3 and the service server 5 may be configured as cloud servers.

Each of the edge devices 2 is mounted on a different registered vehicle 8. Each of the edge devices 2 collects vehicle data of the registered vehicle 8 on which the corresponding edge device is mounted and uploads the collected vehicle data to the management server 3. Each of the edge devices 2 performs vehicle control according to instructions from the management server 3. Each of the edge devices 2 executes various randomly installed application programs.

The multiple edge devices 2 are registered in the service server 5. The mobility IoT system 1 may include at least one edge device in addition to the multiple edge devices 2. At least one edge device collects vehicle data of the registered vehicle 8 on which the corresponding edge device is mounted and uploads the collected vehicle data to the management server 3, but is not registered in the service server 5. That is, at least one edge device does not receive service from the service server 5.

The management server 3 performs communication with each of the edge devices 2 and the service server 5 via a wide area communication network NW. The management server 3 accumulates vehicle data uploaded from each of the edge devices 2 in a database. The management server 3 provides the service server 5 with an interface for accessing the database of the management server 3 and the registered vehicle 8.

The service server 5 uses an interface provided by the management server 3 to collect vehicle data corresponding to the registered vehicle 8 and to perform vehicle control of the registered vehicle 8 and the like. Accordingly, the service server 5 provides various services to the user of the registered vehicle 8. The user of the registered vehicle 8 includes an owner, a driver, and a passenger of the registered vehicle 8.

The multiple terminal devices 7 are mobile terminals such as smartphones and tablets. Each of the terminal devices 7 is owned by the user of the registered vehicle 8 and is associated with the registered vehicle 8. Each of the terminal devices 7 performs communication with the service server 5. Each of the terminal devices 7 executes various randomly installed application programs.

Although the service server 5 is provided separately from the management server 3 in the present embodiment, it may be provided integrally with the management server 3. In addition to the service server 5, the mobility IoT system 1 may also include one or more service servers that provide services different from the service server 5.

<2. Edge Device>

<2-1. Hardware Configuration>

Figure 2:
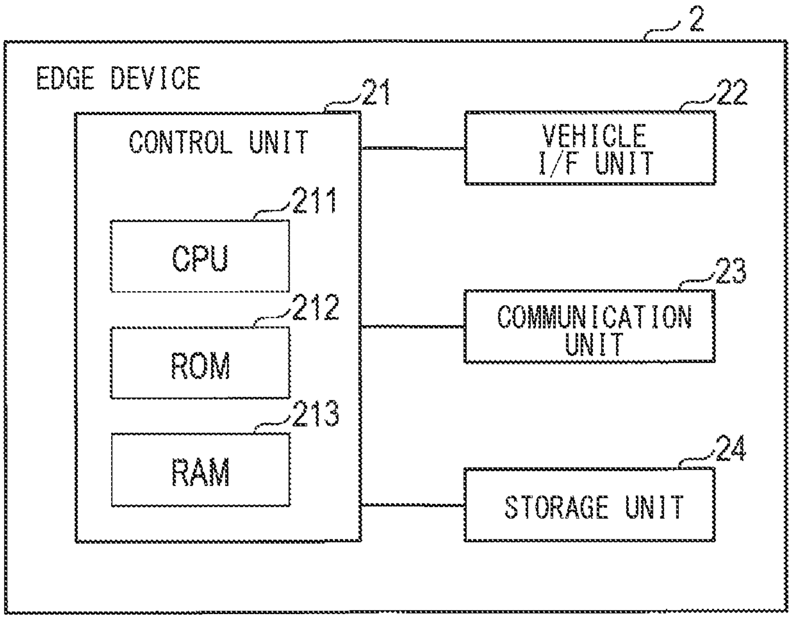
FIG. 2 is a block diagram showing a hardware configuration of an edge device.

As shown in FIG. 2, the edge device 2 includes a control unit 21, a vehicle interface (hereinafter referred to as a vehicle I/F) unit 22, a communication unit 23, and a storage unit 24.

The control unit 21 includes a CPU 211, a ROM 212, and a RAM 213. Various functions of the control unit 21 are implemented by the CPU 211 executing a program stored in a non-transitory tangible storage medium. In the present embodiment, the ROM 212 corresponds to a non-transitory tangible storage medium storing programs. A method corresponding to the program is performed by executing the program.

The vehicle I/F unit 22 is connected to various in-vehicle devices via an in-vehicle network or the like of the registered vehicle 8, and acquires various types of information from the in-vehicle devices. In-vehicle networks may include CAN® and Ethernet®. CAN® is an abbreviation for Controller Area Network. CAN® is a registered trademark.

Ethernet® is a registered trademark. The in-vehicle device connected to the vehicle I/F unit 22 may include an exterior device that is added later as well as a device that is originally mounted on the registered vehicle 8. Exterior devices may include sensors, cameras, audio devices, display devices, and the like.

The communication unit 23 performs data communication with the management server 3 and the service server 5 by wireless communication via the wide area communication network NW.

The storage unit 24 stores vehicle data and the like acquired via the vehicle I/F unit 22. Vehicle data accumulated in the storage unit 24 is uploaded to the management server 3 via the communication unit 23.

<2-2. Functional Configuration>

Figure 3:
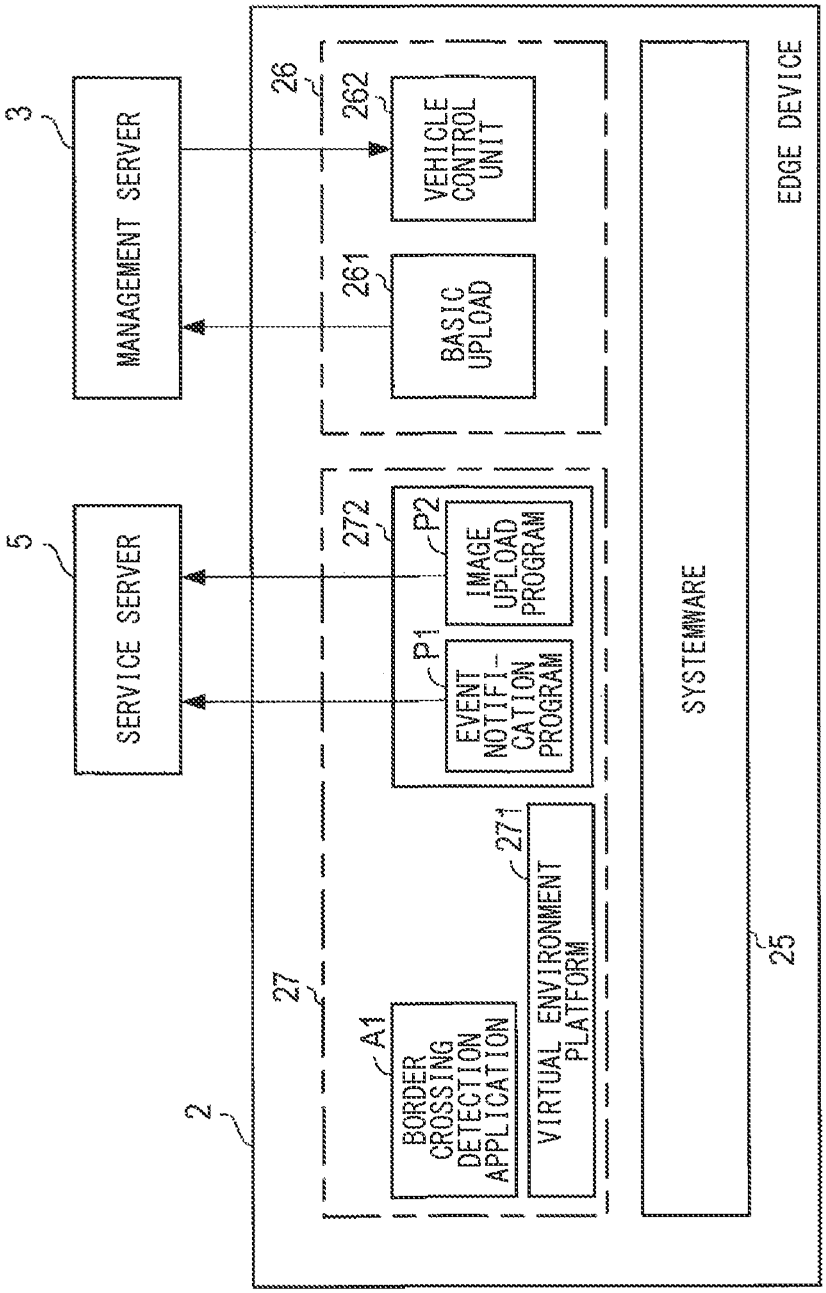
FIG. 3 is a functional block diagram showing a functional configuration of the edge device.

As shown in FIG. 3, the edge device 2 has functions of systemware 25, a core function execution unit 26, and an application execution unit 27. The functions of each of these units 25 to 27 are implemented by the CPU 211 executing programs stored in the ROM 212.

The systemware 25 abstracts hardware and includes basic software for providing various services necessary for executing application programs, and drivers for supporting special processing that cannot be standardized. The basic software includes an operating system (hereinafter referred to as an OS), a hardware abstraction layer (hereinafter referred to as a HAL), and the like. The hardware to be abstracted by the systemware 25 includes in-vehicle devices and exterior devices connected to the edge device 2 via the vehicle I/F unit 22 in addition to the hardware included in the edge device 2.

The core function execution unit 26 and the application execution unit 27 are implemented by software that operates on the systemware 25.

<2-2-1. Core Function Execution Unit>

The core function execution unit 26 has the form of an edge computer that mediates between the management server 3 and the registered vehicle 8. Specifically, the core function execution unit 26 includes a basic upload unit 261 and a vehicle control unit 262. The basic upload unit 261 collects vehicle data of the registered vehicle 8 and uploads the data to the management server 3. The vehicle control unit 262 controls the registered vehicle 8 according to instructions from the management server 3. The control performed by vehicle control unit 262 includes first control, second control, and third control. The first control is control to sound a horn in a designated pattern. The second control is control to flash a designated lighting device in a designated pattern. The third control is control to limit an upper limit of a moving speed.

Vehicle data provided to the management server 3 by the basic upload unit 261 will be described.

The basic upload unit 261 repeatedly collects vehicle data from the registered vehicle 8 via the vehicle I/F unit 22. The basic upload unit 261 converts the collected vehicle data into a standard format and stores it in the storage unit 24 in association with the hierarchical classification. Hereinafter, the hierarchized vehicle data will be referred to as standardized vehicle data.

Figure 4:
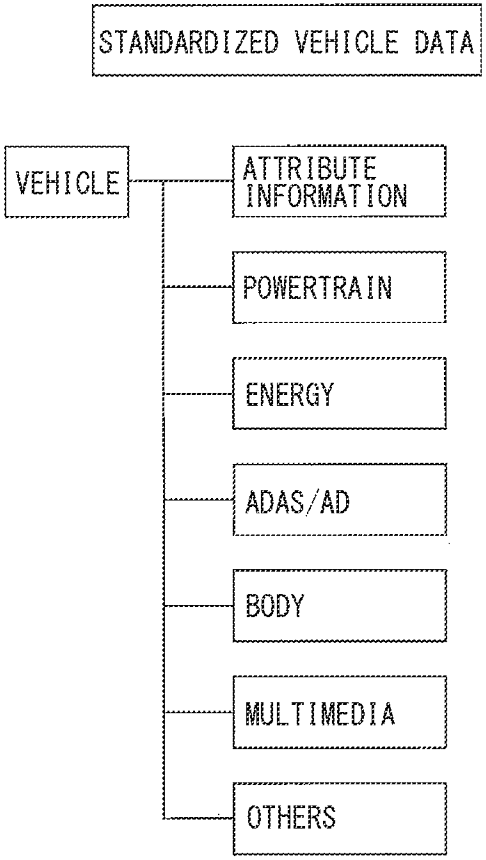
FIG. 4 is a diagram showing a first hierarchy of standardized vehicle data and a data format.

As shown in FIG. 4, the standard format of the vehicle data may include items such as "unique label", "ECU", "data type", "data size", "data value", and "data unit".

A "unique label" is information for identifying each physical quantity. For example, "ETNA" indicates an intake air temperature, and "NE1" indicates an engine speed.

"ECU" is information indicating an electronic control unit (hereinafter referred to as ECU) from which vehicle data was generated. For example, "ENG" indicates that the data was generated by the engine ECU.

A "data type" is information for defining properties of a "data value". A "data type" may include, for example, integer types, floating point types, logical types, character types, and the like.

A "data size" is information indicating how many bytes the "data value" is expressed.

A "data value" is information indicating the value of the physical quantity specified by the "unique label".

"Data unit" is information indicating the unit of the data value.

The "data value" is normalized so that the same physical quantity is expressed in the same unit regardless of the vehicle type and vehicle manufacturer.

The "unique label" may include information for identifying "processed data" in addition to identifying "unprocessed data" obtained from the registered vehicle 8. "Processed data" refers to data converted into a format that is easier for users to understand by performing a predetermined operation on one or more pieces of "unprocessed data".

Standardized vehicle data has multiple hierarchical structures. For example, as shown in FIG. 4, the standardized vehicle data includes "attribute information", "powertrain", "energy", "ADAS/AD", "body", "multimedia", and "others" as items set in a first hierarchy, which is the highest level. ADAS is an abbreviation for Advanced Driver Assistance System. AD is an abbreviation for Autonomous Driving. Each item belonging to the first hierarchy represents a category of vehicle data.

Figure 5:
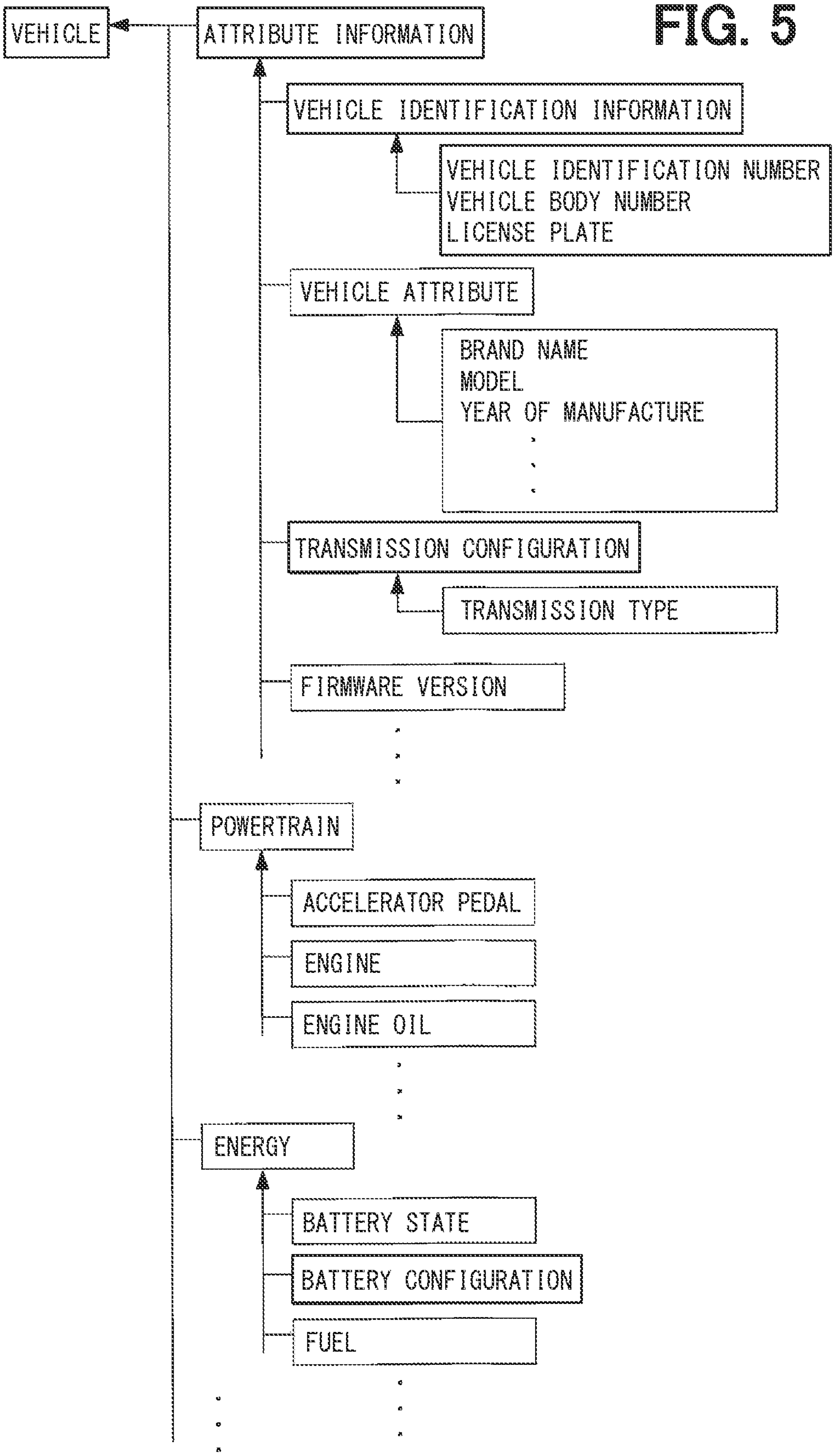
FIG. 5 is a diagram showing a configuration of standardized vehicle data.

As shown in FIG. 5, the standardized vehicle data may have a second hierarchy and a third hierarchy in addition to the first hierarchy. The second hierarchy is the hierarchy immediately below the first hierarchy, and the third hierarchy is the hierarchy immediately below the second hierarchy.

For example, the item "attribute information" in the first hierarchy includes "vehicle identification information", "vehicle attribute", "transmission configuration", "firmware version", and the like as items in the second hierarchy. The item "powertrain" in the first hierarchy includes "accelerator pedal", "engine", "engine oil", and the like as items in the second hierarchy. The item "energy" in the first hierarchy includes "battery state", "battery configuration", "fuel", and the like as items in the second hierarchy. The respective items belonging to the second hierarchy represent a category of vehicle data.

For example, the item "vehicle identification information" in the second hierarchy includes "vehicle identification number", "vehicle body number", "license plate", and the like as items in the third hierarchy. The item "vehicle attribute" in the second hierarchy includes "brand name", "model", "year of manufacture", and the like as items in the third hierarchy. The item "transmission configuration" in the second hierarchy includes "transmission type" as an item in the third hierarchy. Although illustration is omitted, the item "accelerator pedal" in the second hierarchy includes "state of accelerator pedal", "opening degree of accelerator pedal", and the like as items in the third hierarchy. The item "engine" in the second hierarchy includes "state of engine", "rotational speed", and the like as items in the third hierarchy. The respective items in the third hierarchy correspond to a "unique label" in the standard format. That is, each piece of vehicle data is stored in association with each item in the third hierarchy. Each piece of vehicle data belonging to the standardized vehicle data is also referred to as an item.

Thus, each item in the first hierarchy includes one or more items in the second hierarchy, and each item in the second hierarchy includes one or more items in the third hierarchy, that is, vehicle data.

For example, vehicle data whose "unique label" is "vehicle identification information" is stored in a storage area in which the first hierarchy is "attribute information", the second hierarchy is "vehicle identification information", and the third hierarchy is "vehicle identification number" in the standardized vehicle data.

The item "others" in the first hierarchy may include, for example, position information acquired from a GPS device mounted on the registered vehicle 8 via the vehicle I/F unit 22, that is, latitude, longitude, and altitude.

Next, a procedure for uploading vehicle data to the management server 3 by the basic upload unit 261 will be described.

A transmission cycle for transmitting data to the management server 3 is set for each piece of vehicle data belonging to the standardized vehicle data. The transmission cycle is set to be shorter for data that changes more frequently or for data that has a higher degree of importance, depending on the degree of change in the data, the degree of importance of the data, and the like. That is, each piece of vehicle data is transmitted at a frequency according to its characteristics. The transmission cycle is, for example, a 500 ms cycle, a 2 s cycle, a 4 s cycle, a 30 s cycle, a 300 s cycle, a 12 hour cycle, or the like.

The transmission timing is set to a 250 ms cycle, for example. Each piece of vehicle data is uploaded according to the schedule and at the determined transmission timing. The schedule is set so that transmission of a large amount of vehicle data does not concentrate at the same transmission timing.

<2-2-2. Application Execution Unit>

Referring back to FIG. 3, the application execution unit 27 provides a function of executing application programs (hereinafter referred to as external applications) A1, A2, . . . , which are randomly installed later. The application execution unit 27 includes a virtual environment platform 271 and a library 272.

The virtual environment platform 271 has a function of simplifying the execution and management of containerized external applications Ai by virtualizing the OS of the systemware 25. The external application Ai is executed on the virtual environment platform 271. The external application Ai includes the border crossing detection application A1.

The library 272 is a group of programs for providing standard functions commonly used by the external applications Ai. The library 272 includes an event notification program P1 and an image upload program P2. The event notification program P1 provides a function of transmitting event notifications to the service server 5 according to instructions from the external application Ai. The image upload program P2 provides a function of uploading images captured by a video camera in the vehicle cabin to the service server 5 according to instructions from the external application Ai.

<2-2-3. Border Crossing Detection Application>

Figure 6:
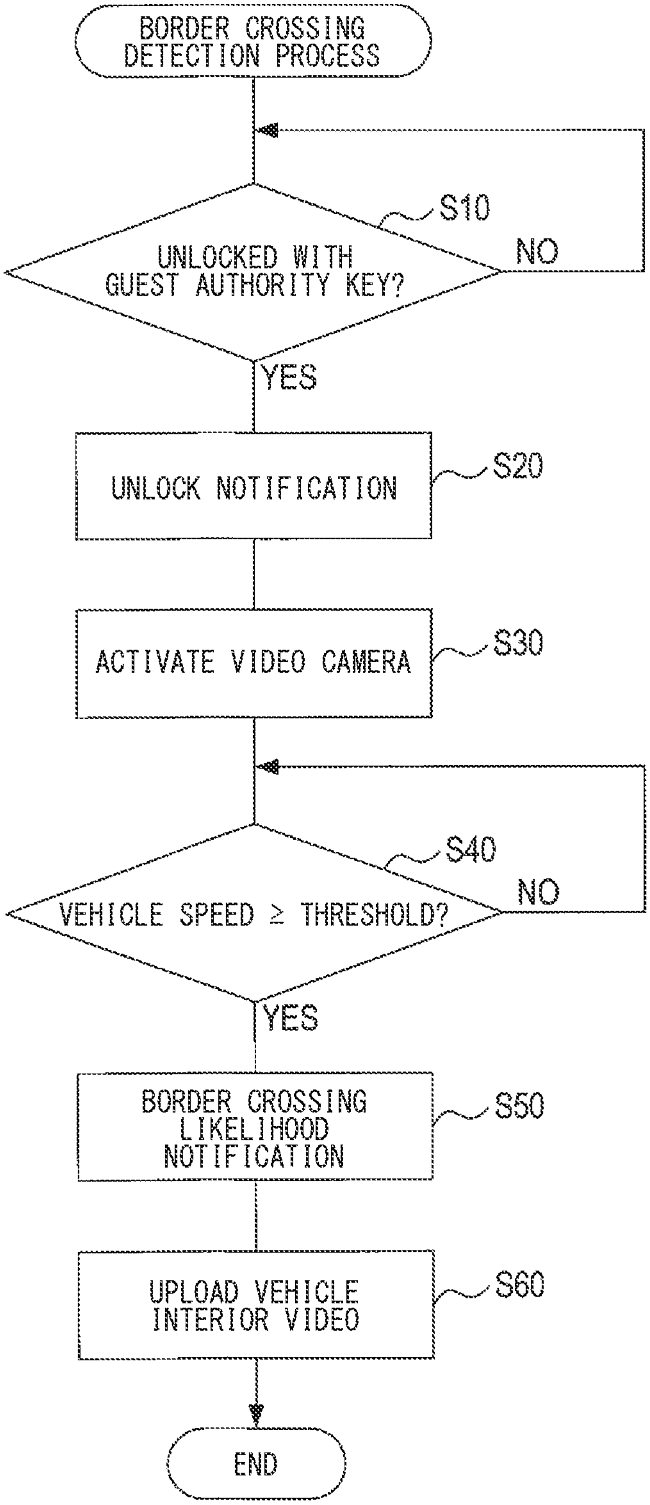
FIG. 6 is a flowchart showing a border crossing detection process of a border crossing detection application.

A processing procedure of the border crossing detection application A1 executed by the CPU 211 of the edge device 2 will be described with reference to the flowchart of FIG. 6. The border crossing detection application A1 is one of the external applications. When the border crossing detection application A1 is installed in the edge device 2, the CPU 211 repeatedly executes the border crossing detection application A1.

One of the services provided by the service server 5 is a cleaning request service. In the cleaning request service, when a user (that is, an owner) requests cleaning of the registered vehicle 8, a cleaning company comes to a parking lot and cleans the parked registered vehicle 8. The user authorizes the cleaning company to open and close the door of the registered vehicle 8 within a limited time so that the user does not have to be present during cleaning. However, the user may hesitate to use the cleaning request service because of the concern that the cleaning company authorized to open and close the door may get into the registered vehicle 8 and run away.

Therefore, the edge device 2 executes the border crossing detection application A1 in order to alleviate the user's concern. By executing the border crossing detection application A1, the edge device 2 detects that the registered vehicle 8 may have crossed the set range (that is, may have been stolen) and notifies the service server 5 of it.

In S10, it is determined whether or not the target vehicle has been unlocked with a guest authority key. The guest authority key is a key given by the user of the target vehicle to another person (that is, a temporary user), such as a digital key. The guest authority key includes information indicating the type and/or magnitude of authority given to other vehicles by the user of the target vehicle. For example, the greater the guest authority, the wider the range in which the target vehicle can move. The target vehicle is a vehicle among the registered vehicles 8 that is executing the border crossing detection application A1.

A digital key can be implemented, for example, with a smartphone application. A user (for example, an owner) of a target vehicle gives a guest authority key to a cleaning company when requesting cleaning of the target vehicle. When the user of the registered vehicle 8 lends the registered vehicle 8 to someone, the user gives the person a guest authority key.

When it is determined in S10 that the door has been unlocked with the guest authority key, the process proceeds to S20, and when it is determined that the door has not been unlocked with the guest authority key, the process of S10 is repeatedly performed.

In S20, the service server 5 is notified via the communication unit 23 that the door has been unlocked with the guest authority key. The unlock notification corresponds to a first event notification of the present disclosure. The current position of the registered vehicle 8 may be included in the unlock notification.

In S30, the video camera in the vehicle cabin of the target vehicle is activated.

In S40, it is determined whether or not the vehicle speed of the target vehicle is equal to or higher than a preset threshold. When it is determined that the vehicle speed is equal to or higher than the threshold, the process proceeds to S50, and when it is determined that the vehicle speed is less than the threshold, the process of S40 is repeatedly performed.

In S50, the service server 5 is notified via the communication unit 23 that the target vehicle may have crossed the border. The border crossing likelihood notification corresponds to a second event notification of the present disclosure. When a company provides a service, it may be desired to slightly move the target vehicle from a parking lot or the like. In such a case, when the border crossing is erroneously detected, the company may not be able to provide sufficient services. By determining whether the vehicle has crossed the border in response to the vehicle speed being equal to or higher than the threshold, the occurrence of the border crossing can be detected with high accuracy. The threshold is about the speed limit in the parking lot, for example, 10 km/h.

Subsequently, in S60, the video of the vehicle interior captured by the video camera is uploaded to the service server 5 via the communication unit 23, and the process ends.

<3. Management Server>

<3-1. Hardware Configuration>

Figure 7:
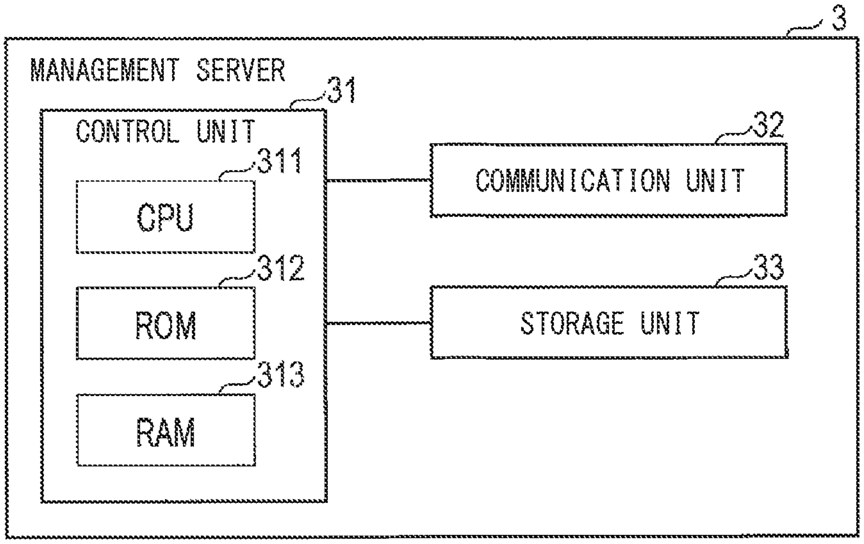
FIG. 7 is a block diagram showing a hardware configuration of a management server.

As shown in FIG. 7, the management server 3 includes a control unit 31, a communication unit 32, and a storage unit 33. The management server 3 corresponds to a first management unit of the present disclosure.

The control unit 31 includes a CPU 311, a ROM 312, and a RAM 313. Various functions of the control unit 31 are implemented by the CPU 311 executing a program stored in a non-transitory tangible storage medium. In this example, the ROM 312 corresponds to a non-transitory tangible storage medium storing programs. A method corresponding to the program is performed by executing the program.

The communication unit 32 performs data communication with the multiple edge devices 2 and the service server 5 via a wide area communication network NW. For communication with the edge devices 2, for example, MQTT, which is a publish/subscribe type simple and lightweight protocol, may be used. MQTT is an abbreviation for Message Queue Telemetry Transport.

The storage unit 33 is a storage device for storing vehicle data and the like provided from the edge device 2.

<3-2. Functional Configuration>

Figure 9:
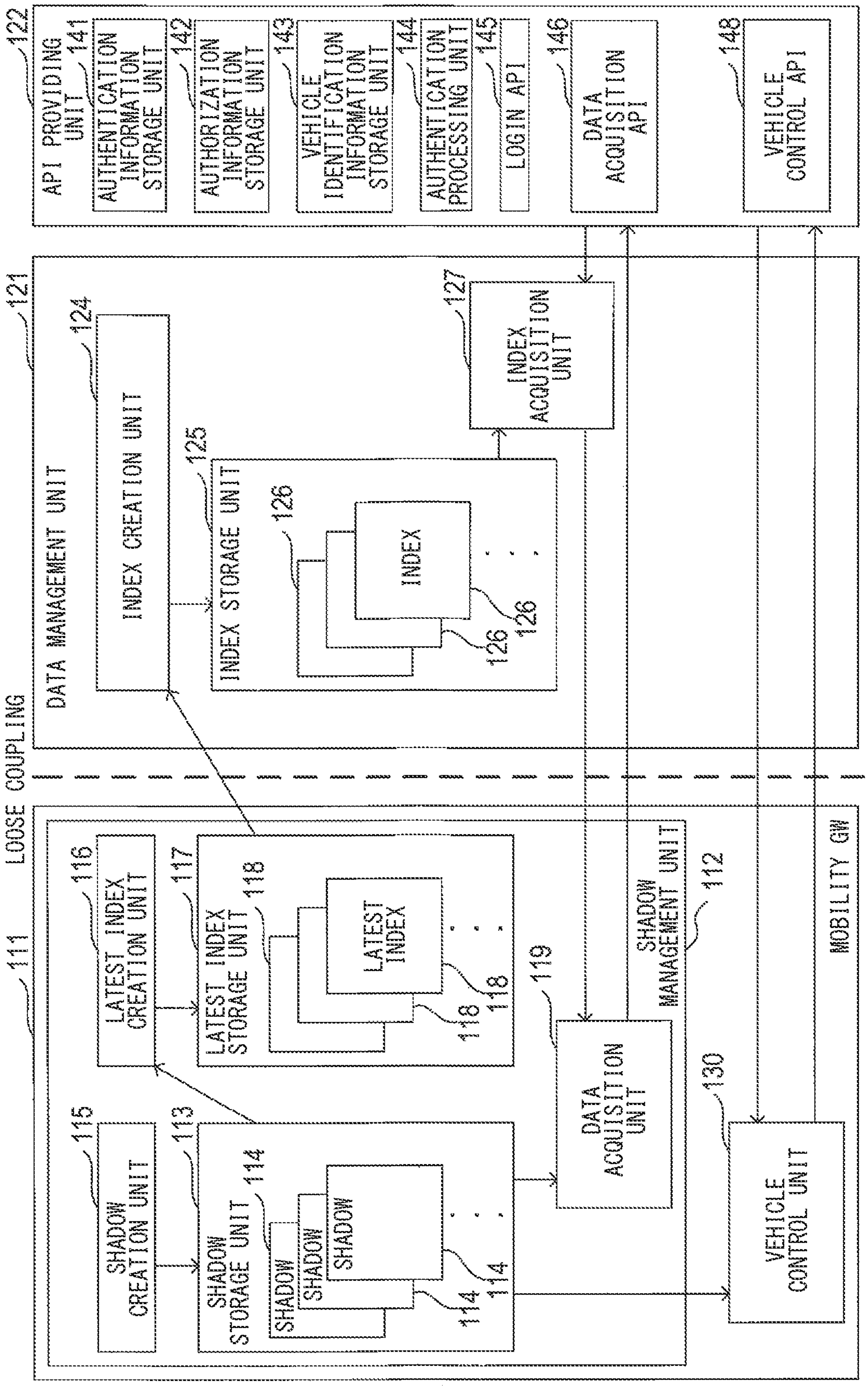
FIG. 9 is a functional block diagram showing functional configurations of a mobility GW and a data management unit.

As shown in FIG. 9, the management server 3 has the functions of a vehicle-side unit 110 and a service-side unit 120.

The method of implementing these functions provided by the management server 3 is not limited to software, and some or all of the elements may be implemented using one or more pieces of hardware. For example, when the above functions are implemented by an electronic circuit that is hardware, the electronic circuit may be implemented by a digital circuit including many logic circuits, an analog circuit, or a combination thereof.

The vehicle-side unit 110 includes a mobility gateway (hereinafter referred to as a mobility GW) 111.

The mobility GW 111 includes a shadow management unit 112 and a vehicle control unit 130. The shadow management unit 112 has a function of managing shadows 114 provided for each vehicle equipped with the edge device 2. The shadow 114 is generated on the basis of the standardized vehicle data transmitted from the edge device 2. The vehicle control unit 130 has a function of controlling the vehicle equipped with the edge device 2 according to instructions from the service server 5.

The service-side unit 120 includes a data management unit 121 and an API providing unit 122. API is an abbreviation for Application Programming Interface.

The data management unit 121 has a function of managing a digital twin 123, which is a virtual space for providing vehicle access independent of changes in vehicle connection state. The digital twin 123 is one of databases constructed on the storage unit 33.

The API providing unit 122 is a standard interface for the service server 5 to access the mobility GW 111 and the data management unit 121.

<3-2-1. Data Accumulation Function>

As shown in FIG. 9, the shadow management unit 112 includes a shadow creation unit 115, a shadow storage unit 113, a latest index creation unit 116, and a latest index storage unit 117 as a configuration for implementing a function of accumulating vehicle data acquired from the edge device 2.

Each time vehicle data is transmitted from the edge device 2, the shadow creation unit 115 updates the standardized vehicle data by overwriting the corresponding area of the structured standardized vehicle data with the transmitted vehicle data. That is, standardized vehicle data is provided for each vehicle and updated asynchronously.

Using the updated standardized vehicle data, the shadow creation unit 115 simultaneously creates new shadows 114 for all vehicles at regular cycles. The shadow creation unit 115 accumulates the created shadows 114 in the shadow storage unit 113. Accordingly, the shadow storage unit 113 stores multiple shadows 114 created in time series for each vehicle. That is, the shadow 114 can be regarded as a copy of the state of the edge-equipped vehicle at a certain point in time.

As shown in FIG. 10, the shadow 114 includes a vehicle data storage unit 114*a* and a device data storage unit 114*b*.

The vehicle data storage unit 114*a* stores "object-id", "Shadow_version", and "mobility-data" as data related to the edge-equipped vehicle.

The item "object-id" is a character string that identifies a vehicle equipped with the edge device 2, and functions as a partition key.

The item "Shadow_version" is a numerical value indicating the version of the shadow 114, and a time stamp indicating the creation time is set each time the shadow 114 is created.

The item "mobility-data" is the value of standardized vehicle data at the time represented by the time stamp.

The device data storage unit 114*b* stores "object-id", "update_time", "version", "power_status", "power_status_timestamp", and "notify_reason" as data related to the hardware, software, and status installed in the edge device 2.

The item "object-id" is a character string that identifies a vehicle equipped with the edge device 2, and functions as a partition key.

The item "update_time" is a numerical value indicating the update time of hardware and software.

The item "version" is a character string indicating the version of hardware and software.

The item "power_status" is a character string indicating the system status of the edge device 2. Specifically, there are a "power-on" status in which all functions can be used, and a "power-off" status in which some functions are stopped to reduce power consumption.

The item "power_status_timestamp" is a numerical value indicating the notification time of the system status.

The item "notify_reason" is a character string indicating the reason for notification.

The items "version", "power_status", "notify_reason", and the like stored in the device data storage unit 114*b* are notified separately from the standardized vehicle data from the edge device 2 when a change occurs.

Referring back to FIG. 9, the latest index creation unit 116 acquires the latest shadow 114 for each vehicle from the shadow storage unit 113 and creates a latest index 118 using the acquired shadow 114. The latest index creation unit 116 stores the created latest index 118 in the latest index storage unit 117. The latest index storage unit 117 stores one latest index 118 for each vehicle (that is, for each object-id).

As shown in FIG. 11, the latest index 118 stores "gateway-id", "object-id", "shadow-version", "vin", "location-lon", "location-lat", and "location-alt".

The items "object-id" and "shadow-version" are the same as those described for the shadow 114.

The item "gateway-id" is information for identifying the mobility GW 111. This is information for identifying multiple management servers 3, for example, when the multiple management servers 3 are provided for each country.

The item "vin" is a unique registration number assigned to the edge-equipped vehicle.

The item "location-lon" is information indicating the longitude at which the edge-equipped vehicle is present.

The item "location-lat" is information indicating the latitude at which the edge-equipped vehicle is present.

The "location-alt" is information indicating the altitude at which the edge-equipped vehicle is present.

Referring back to FIG. 9, the data management unit 121 includes an index creation unit 124 and an index storage unit 125 as a configuration for implementing a function of accumulating the latest index 118 acquired from the shadow management unit 112 as an index 126.

The index creation unit 124 acquires the latest index 118 from the latest index storage unit 117 according to a preset acquisition schedule, and creates an index 126 for the digital twin 123 using the acquired latest index 118. The index creation unit 124 sequentially stores the created indexes 126 in the index storage unit 125. Accordingly, the index storage unit 125 stores multiple indexes 126 created in time series for each vehicle. That is, each of the indexes 126 stored in the index storage unit 125 represents a vehicle that exists on the digital twin 123, which is virtual time and space.

As shown in FIG. 12, the index 126 stores "timestamp", "schedule-type", "gateway-id", "object-id", "shadow-version", "vin", "location", and "alt".

The item "timestamp" is a time stamp indicating the time in milliseconds when the index 126 was created.

The item "schedule-type" indicates whether or not the scheduler that created the data is regular or an event. When the scheduler is regular, "schedule-type" is set to 'Repeat', and when the scheduler is an event, "schedule-type" is set to "Event".

The items "gateway-id", "object-id", "shadow-version", and "vin" are information inherited from the latest index 118.

The item "location" is information inherited from "location-lon" and "location-lat" of the latest index 118, and the item "alt" is information inherited from "location-alt" of the latest index 118.

<3-2-2. Service Provision Function>

Figure 8:
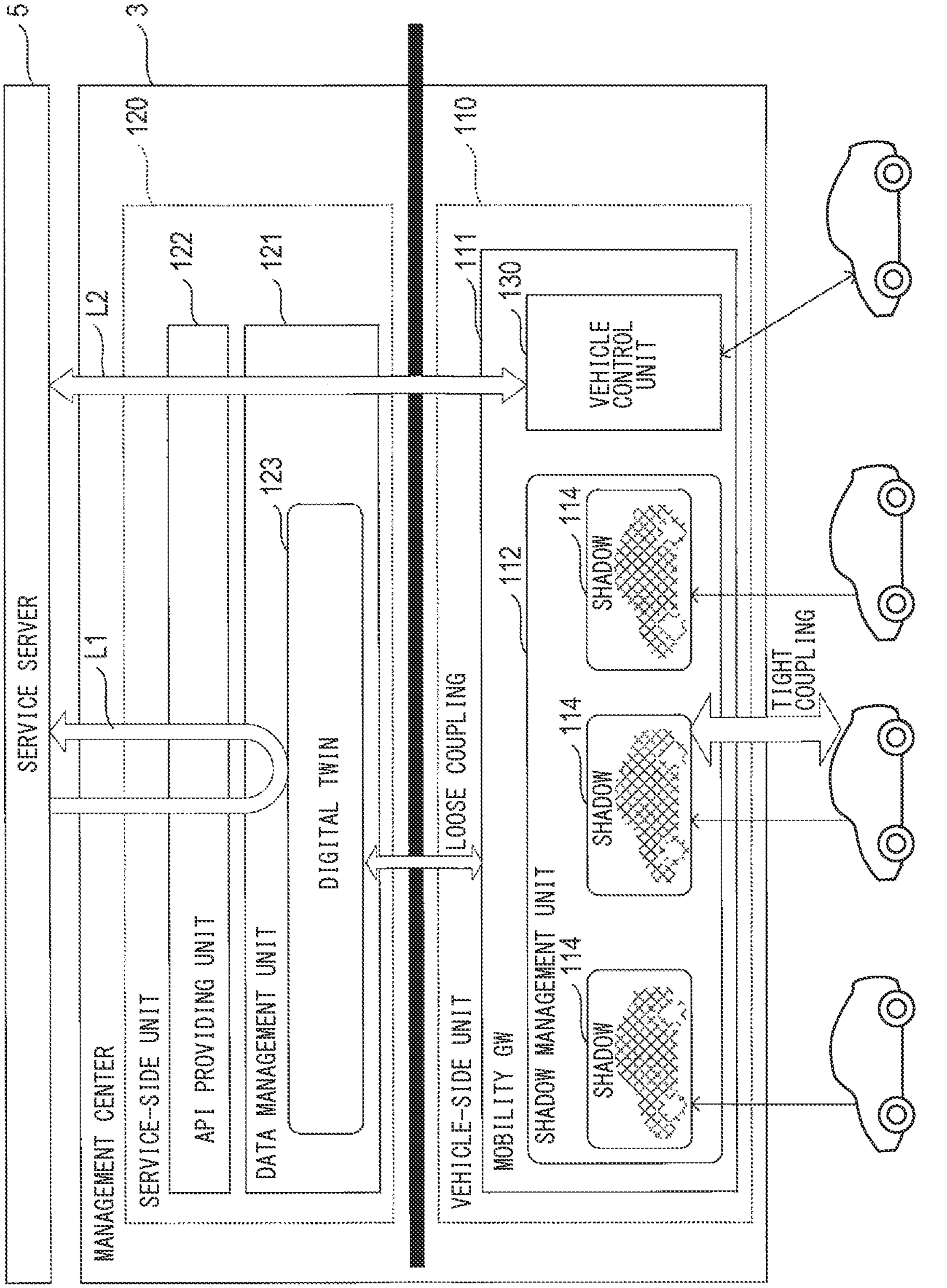
FIG. 8 is a functional block diagram showing a functional configuration of the management server.

As shown in FIGS. 8 and 9, the service-side unit 120 includes the API providing unit 122. The API providing unit 122 is an interface prepared to allow an external service provider such as the service server 5 to use the functions of the management server 3. Hereinafter, a user of the mobility IoT system 1 who uses the API providing unit 122 or the like is referred to as a service user. A service user is, for example, a service provider that makes home deliveries to a trunk of a vehicle.

The API providing unit 122 includes an authentication information storage unit 141, an authorization information storage unit 142, a vehicle identification information storage unit 143, and an authentication processing unit 144, as shown in FIG. 9. As types of APIs provided to service users, a login API 145, a data acquisition API 146, and a vehicle control API 148 are provided.

The authentication information storage unit 141 stores "authentication information" in association with a "service user ID". The item "service user ID" is identification information for uniquely identifying a service user. The item "authentication information" is a preset password.

The authorization information storage unit 142 stores "authorization information" in association with a "service user ID". The item "authorization information" is information designating, for each service user, the range of available services among all the services provided by the management server 3.

The vehicle identification information storage unit 143 stores table information in which the "object-id" uniquely assigned to the edge-equipped vehicle is associated with the "vin" of the edge-equipped vehicle.

The authentication processing unit 144 performs an authentication process when an authentication request is made via the login API 145, and performs an authorization process when an access request is made via the data acquisition API 146 and the vehicle control API 148.

The login API 145 is used when logging into the management server 3. When the login API 145 receives an authentication request from the service user, the authentication processing unit 144 performs an authentication process. In the authentication process, the "service user ID" and "authentication information" input by the login API 145 are collated with the registered contents of the authentication information storage unit 141. When the information matches as a result of collation, that is, when the authentication is successful, access to the management server 3 is permitted.

The data acquisition API 146 is an API used to access vehicle data (that is, the index 126 and the shadow 114) accumulated in the management server 3, as indicated by L1 in FIG. 8. The vehicle control API 148 is an API used to access edge-equipped vehicles, as indicated by L2 in FIG. 9.

The data acquisition API 146 and the vehicle control API 148 may perform an authorization process upon receiving an access request from a service user. An authorization process is a process for permitting or denying an access request according to an authority granted in advance to the service user.

The data acquisition API 146 and the vehicle control API 148 may use either "object-id" or "vin" as information for specifying the vehicle. When "vin" is used as the information for specifying the vehicle, the vehicle identification information storage unit 143 may be referenced to convert the information for specifying the vehicle from "vin" to "object-id".

<3-2-3. Data Acquisition Function>

As shown in FIG. 9, the management server 3 includes an index acquisition unit 127 and a data acquisition unit 119 as a configuration for processing access requests (hereinafter referred to as data acquisition requests) via the data acquisition API 146.

A data acquisition process performed by the index acquisition unit 127 and the data acquisition unit 119 when the data acquisition API 146 receives a data acquisition request from the service user will be described.

The data acquisition request includes vehicle designation information, time designation information, and data designation information.

The vehicle designation information is information for designating a vehicle that provides vehicle data (hereinafter referred to as a target vehicle). The vehicle designation information includes a method of listing the vehicle IDs (that is, object-id or yin) of the target vehicle in the form of a list, and a method of designating a geographical area where the target vehicle exists (hereinafter referred to as area designation).

The time designation information is information for designating a timing at which the data was generated. The time designation information is represented by a starting time and a range. The range is, for example, a value in which the time width is represented by an integer equal to or greater than 1, with a generation cycle of the latest index 118 being the unit time.

The data designation information is information for designating data to be acquired. The data designation information may be represented in the form of a list of item names of data indicated in the standardized vehicle data, or may be represented by designating category names indicated in the standardized vehicle data. A category name being designated corresponds to all items belonging to that category being designated. When neither the item name nor the category name is designated, this corresponds to all items being designated.

The method of setting the vehicle designation information, the time designation information, and the data designation information shown here is an example, and the present disclosure is not limited to the above method.

The index acquisition unit 127 extracts all indexes 126 having "timestamp" within the time range indicated in the time designation information for all vehicles specified by the vehicle designation information indicated in the data acquisition request.

The index acquisition unit 127 generates shadow specifying information by combining the "object-id" and "shadow-version" shown in the index 126 for each extracted index 126. Accordingly, a shadow list listing shadow specifying information is generated.

The index acquisition unit 127 outputs, to the data acquisition unit 119 of the shadow management unit 112, a shadow access request in which the data designation information indicated in the data acquisition request is added to the generated shadow list.

That is, the index acquisition unit 127 uses the vehicle designation information and the time designation information indicated in the data acquisition request from the data acquisition API 146 as acquisition conditions, and generates the shadow list according to these acquisition conditions. The index acquisition unit 127 also outputs, to the data acquisition unit 119, a shadow access request obtained by combining the generated shadow list and the data designation information.

When the shadow access request is input from the index acquisition unit 127, the data acquisition unit 119 refers to the shadow storage unit 113 to extract the shadow 114 corresponding to each piece of shadow specifying information indicated in the shadow list of the shadow access request. Furthermore, the data acquisition unit 119 extracts designated data, which is data indicated in the data designation information of the shadow access request, from each of the extracted shadows 114, and returns the extracted designated data as an access result to the data acquisition API 146, which is the source of the request.

<3-2-4. Vehicle Control Function>

As shown in FIG. 9, the management server 3 includes a vehicle control unit 130 as a configuration for processing an access request (hereinafter referred to as a vehicle control request) via the vehicle control API 148.

A vehicle control process performed by the vehicle control unit 130 when the vehicle control API 148 receives a vehicle control request from the service user will be described.

The vehicle control request includes vehicle designation information, execution target information, and control designation information. The vehicle control request may further include priority information, time limit information, and vehicle authentication information.

One vehicle ID is indicated in the vehicle designation information. A vehicle specified by the vehicle ID is a target vehicle which is a control target.

The execution target information is information for designating which application installed in the registered vehicle 8 is to execute the control content indicated in the control designation information, and indicates an application ID that identifies the application.

The control designation information indicates specific contents of control to be performed by the registered vehicle 8. For example, the specific contents of control may include key operation of various doors such as each seat door and trunk door, operation of audio equipment such as horn and buzzer, operation of various lamps such as headlamps and hazard flashers, and operation of various sensors such as cameras and radar. The control designation information may indicate one control, or may indicate multiple controls to be performed continuously in the form of a list. The controls shown in the form of a list are performed in the order listed.

The priority information indicates the priority when transmitting the control instruction generated on the basis of the vehicle control request to the registered vehicle 8. The priority information may be set by the service user who is the source of the request, or may be automatically set according to the content of control indicated in the control designation information.

The time limit information indicates the final time at which control is permitted in the registered vehicle 8. The time limit information is set with, for example, the time when the vehicle control request is input plus 10 minutes as the limit. Similarly to the priority information, the time limit information may be set by the service user who is the source of the request, or may be automatically set according to the content of the control requested of the vehicle.

The vehicle authentication information is information used for determining whether or not the target vehicle can receive the control instruction, and may be composed of an owner ID and a password for identifying an owner of the target vehicle. The vehicle authentication information is maintained on the registered vehicle 8 and also on service users permitted to access the vehicle.

When a vehicle control request is input from the vehicle control API 148, the vehicle control unit 130 transmits one or more control instructions generated on the basis of the vehicle control request to the target vehicle.

When the edge device 2 receives the control instruction from the management server 3, the edge device performs authentication by collating the vehicle authentication information indicated in the control instruction with the vehicle authentication information of the subject vehicle.

When the authentication succeeds, the edge device 2 causes the application specified by the execution target information to execute the control indicated in the control designation information. The edge device 2 transmits a response including the control execution result to the management server 3.

The vehicle control unit 130 that has received the response returns the content of the response to the vehicle control API 148.

<4. Service Server>

<4-1. Hardware Configuration>

Figure 13:
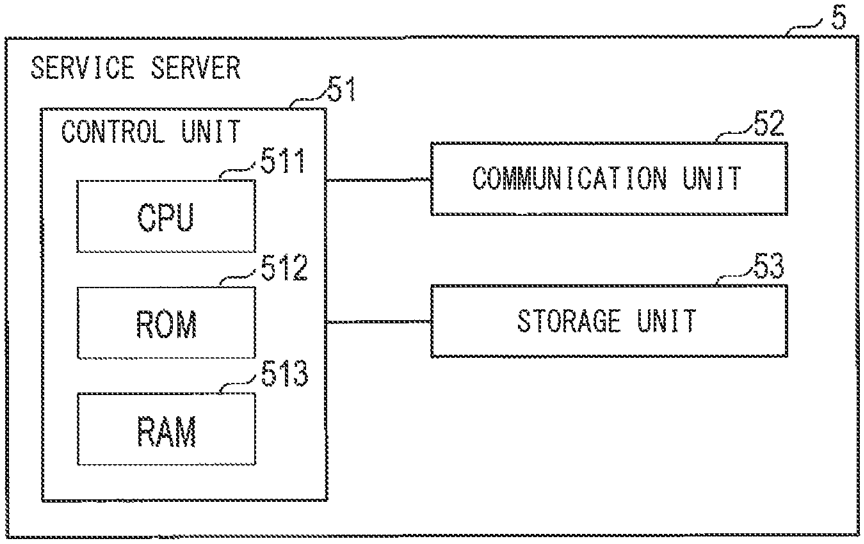
FIG. 13 is a block diagram showing a hardware configuration of a service server.

As shown in FIG. 13, the service server 5 includes a control unit 51, a communication unit 52, and a storage unit 53. The service server 5 corresponds to a second management unit of the present disclosure.

The control unit 51 includes a CPU 511, a ROM 512, and a RAM 513. Various functions of the control unit 51 are implemented by the CPU 511 executing a program stored in a non-transitory tangible storage medium. In this example, the ROM 512 corresponds to a non-transitory tangible storage medium storing programs. A method corresponding to the program is performed by executing the program.

The communication unit 52 performs communication with the edge device 2, the management server 3, and the terminal device 7 via a wide area communication network NW. For communication with the terminal device 7, a network different from the network used for communication with the management server 3 may be used.

The storage unit 53 stores various types of information necessary for providing services.

<4-2. Functional Configuration>

Figure 14:
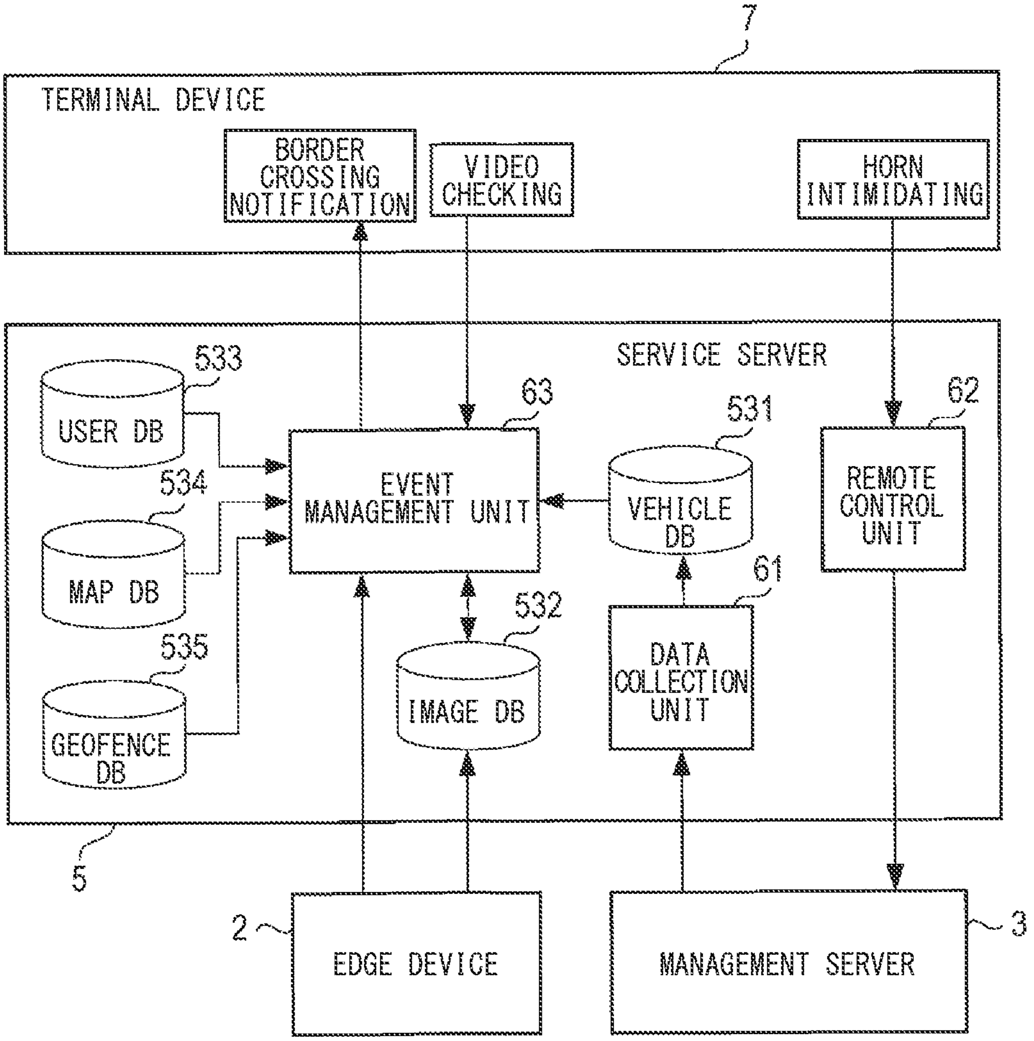
FIG. 14 is a functional block diagram showing a functional configuration of the service server.

As shown in FIG. 14, the service server 5 includes a data collection unit 61, a remote control unit 62, and an event management unit 63. The service server 5 also includes multiple databases (hereinafter referred to as DBs), specifically a vehicle DB 531, an image DB 532, a user DB 533, a map DB 534, and a geofence DB 535.

The vehicle DB 531 stores vehicle data that the data collection unit 61 acquires from the management server 3. The image DB 532 stores image data uploaded from the edge device 2. The user DB 533 stores driver information, which is information about the driver of the registered vehicle 8. The driver information includes a vehicle ID of the registered vehicle 8 associated with the driver and a method of contacting the terminal device 7 (for example, telephone number, e-mail address, and the like). The map DB 534 stores map information used for navigation and the like. The geofence DB 535 stores a geofence set on the basis of the position of the registered vehicle 8 stored in the vehicle DB 531 and the map information stored in the map DB 534. A geofence is an area enclosed by a virtual geographic boundary line.

The data collection unit 61 uses the data acquisition API provided by the management server 3 to repeatedly acquire the position information of all registered vehicles 8, and stores the latest position information of each registered vehicle 8 in the vehicle DB 531.

The remote control unit 62 performs vehicle control of the designated registered vehicle 8 by using the vehicle control API 148 provided by the management server 3 according to instructions from the terminal device 7.

Upon receiving an event notification from the edge device 2, the event management unit 63 performs a process according to the content of the event notification.

<4-3. Event Process>

<4-3-1. First Example>

Figure 15:
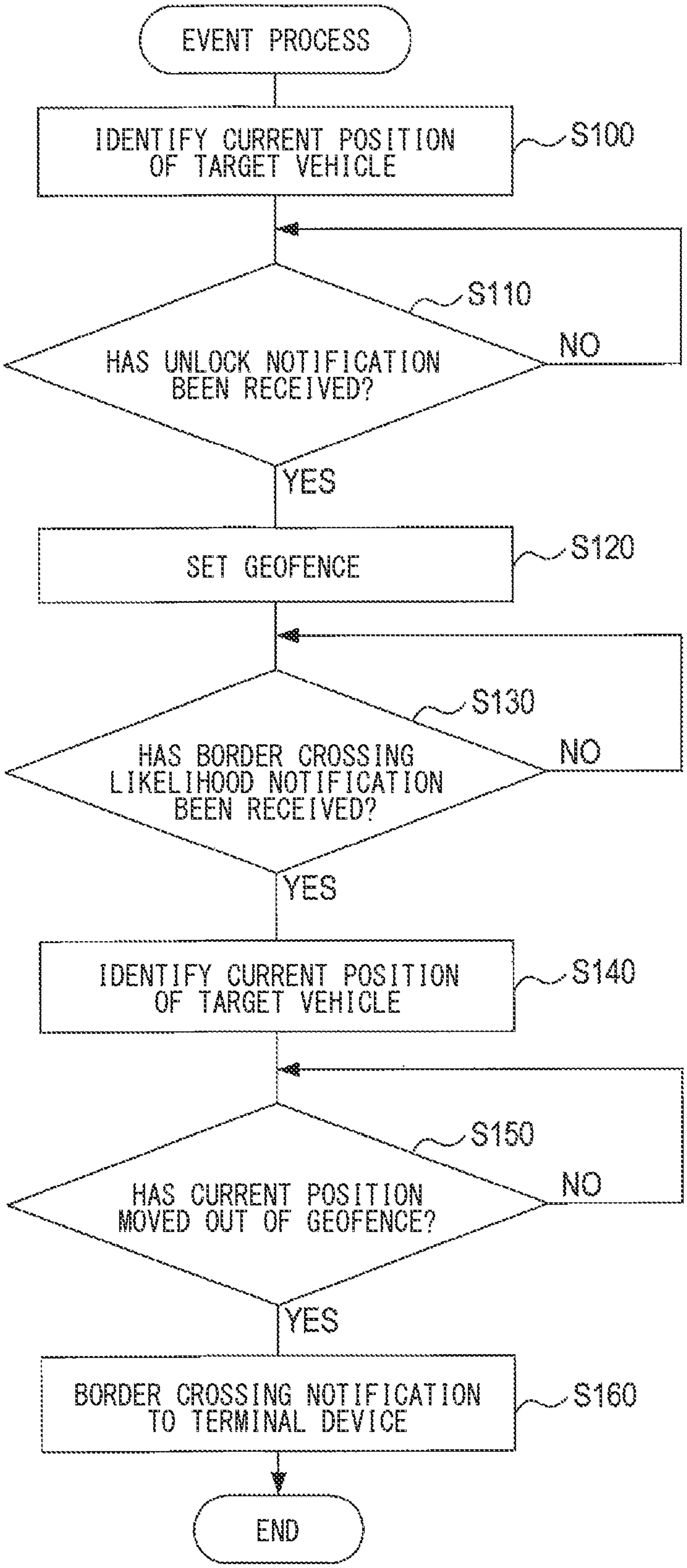
FIG. 15 is a flowchart showing a first example of an event process performed by an event management unit of the service server.

A first example of an event process performed by the CPU 511 of the service server 5 will be described with reference to the flowchart of FIG. 15. In the first example, the CPU 511 transmits a border crossing notification to the terminal device 7 associated with the edge device 2.

In S100, the current position of the target vehicle is identified. The CPU 511 searches the vehicle DB 531 to identify the position of the target vehicle.

Subsequently, in S110, it is determined whether or not an unlock notification has been received from the edge device 2 via the communication unit 52. When it is determined that the unlock notification has been received, the process proceeds to S120, and when it is determined that the unlock notification has not been received, the process of S110 is repeatedly performed.

In S120, a geofence including the current position identified in S100 is set. At this time, the shape and/or size of the geofence may be changed according to the authority of the occupant of the registered vehicle 8. For example, when the occupant is a guest, the size of the geofence is set smaller than when the occupant is the owner of the registered vehicle 8. When the occupant is the owner of the registered vehicle 8, the size of the geofence may be set to infinity.

Further, when the occupant is a guest, the shape and/or size of the geofence may be changed according to the type and/or size of guest authority acquired from the guest authority key. For example, when the guest authority is authority given to a cleaning company, the range of the geofence is limited to within the parking lot, and the shape of the geofence is set to be rectangular. When the guest authority is authority given to the family of the user of the registered vehicle 8, the range of the geofence is limited to within the prefecture, and the shape of the geofence is set to be circular.

Multiple geofences having different sizes may be set in multiple stages. A first geofence of the multiple geofences includes therein a second geofence that is smaller than the first geofence and covered by the first geofence. That is, multiple nested geofences may be set.

Subsequently, in S130, it is determined whether or not a border crossing likelihood notification has been received from the edge device 2 via the communication unit 52. When it is determined that the border crossing likelihood notification has been received, the process proceeds to S140, and when it is determined that the border crossing likelihood notification has not been received, the process of S130 is repeatedly performed.

In S140, the vehicle DB 531 is searched to identify the current position of the target vehicle.

In S150, it is determined whether or not the current position identified in S140 has moved out of the geofence set in S120. In S120, when multiple geofences have been set, it is determined whether or not the current position has moved out of each of the multiple geofences.

When it is determined that the current position has moved out of the geofence, the process proceeds to S160, and when it is determined that the current position is within the geofence, the process of S150 is repeatedly performed. In S120, in a case where multiple geofences are set, when it is determined that the current position has moved out of the smallest geofence, the process proceeds to S160, and when it is determined that the current position is within the smallest geofence, the process of S150 is repeatedly performed.

In S160, a border crossing notification is transmitted via the communication unit 52 to the terminal device 7 associated with the target vehicle. Accordingly, the user can check a vehicle interior video uploaded to the service server 5 via the terminal device 7. Furthermore, the user can instruct vehicle control of the target vehicle via the terminal device 7. Vehicle control includes, for example, sounding the horn of the target vehicle and flashing the lamp of the target vehicle. Vehicle control may include braking control and steering control.

When multiple geofences are set, the border crossing notification may be changed according to the current position. For example, each time the current position moves out of a larger geofence, the terminal device 7 is given a higher level of border crossing notification.

When the edge device 2 transmits the unlock notification including the current position of the registered vehicle 8, the CPU 511 does not have to perform the process of S100.

In S150, instead of determining whether or not the current position identified in S140 has moved out of the geofence set in S120, the CPU 511 may determine whether or not there is a likelihood that the registered vehicle 80 will move out of the geofence on the basis of the current position and the trajectory of the registered vehicle 80. The trajectory of the registered vehicle 80 corresponds to a line connecting the current positions identified in the current and past processing cycles. The CPU 511 may transmit a border crossing notification to the terminal device 7 when determining that there is a high likelihood that the registered vehicle 80 will move out of the geofence even before the registered vehicle 80 moves out of the geofence.

The use of border crossing detection is not limited to detection of theft of the registered vehicle 8. The service server 5 may use the detection of border crossing of the registered vehicle 8 to provide a monitoring service for novice drivers who have just obtained their driver's license and elderly people. When the service server 5 provides a monitoring service, for example, the owner sets the geofence within the prefecture for guests who are novice drivers, and sets the geofence to the range of hospitals and supermarkets for guests who are elderly people. The owner can recognize that trouble may have occurred when receiving the border crossing notification after detecting an event in which a novice driver or an elderly person has boarded the registered vehicle 8. As a result, the owner can cope with the problem on the premise that trouble will occur.

<4-3-2. Second Example>

Figure 16:
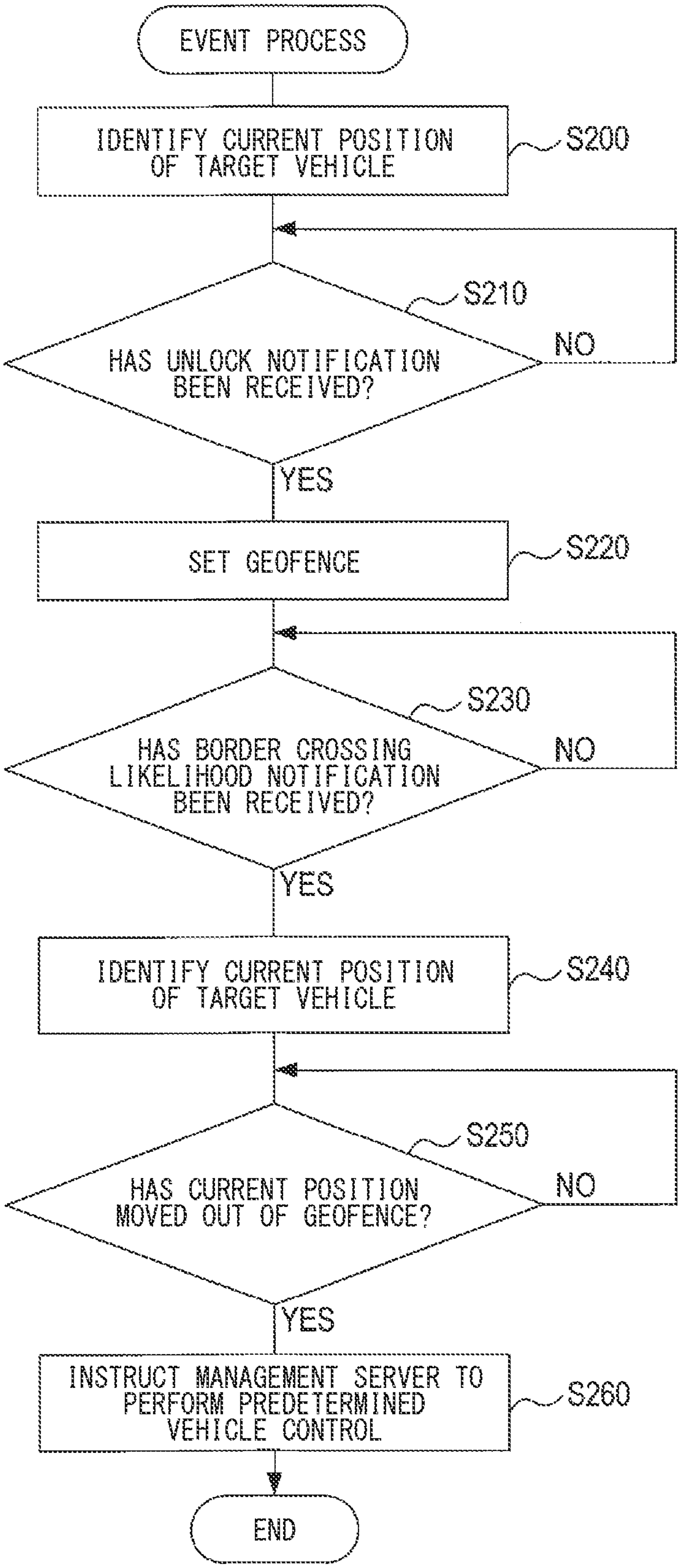
FIG. 16 is a flowchart showing a second example of an event process performed by the event management unit of the service server.

A second example of an event process performed by the CPU 511 of the service server 5 will be described with reference to the flowchart of FIG. 16. In the second example, the CPU 511 commands the management server 3 to perform vehicle control on the target vehicle.

In S200 to S250, the same processes as in S100 to S150 are performed.

In S250, the management server 3 is instructed to perform predetermined vehicle control of the target vehicle. That is, in the second example, the predetermined vehicle control of the target vehicle is instructed directly to the management server 3 not via the terminal device 7. The predetermined vehicle control includes sounding the horn of the target vehicle and flashing the lamp of the target vehicle. The predetermined vehicle control may include braking control and steering control.

When multiple geofences are set, the vehicle control may be changed according to the current position. For example, when the current position moves out of the minimum geofence, the horn is sounded. When the current position moves out of the second smallest geofence, the lamps are flashed in addition to the horn being sounded. When the current position moves out of the maximum geofence, further braking control is performed.

<5. Terminal Device>

A terminal application is installed in the terminal device 7. The terminal application uses a graphic user interface (hereinafter referred to as a GUI), and has functions of displaying notifications from the service server 5, playing vehicle interior videos, and instructing the service server 5 to perform vehicle control.

A video viewing screen, a menu button, and the like are displayed on the GUI of the terminal application. Menu buttons include a video playback button and a vehicle control button.

When the terminal application receives the border crossing notification, the terminal application may display an icon or the like indicating that the border crossing notification has been received on the display screen of the terminal device 7, and also use audio equipment or the like mounted on the terminal device 7 to give a notification by voice or vibration.

When the terminal device 7 receives the video upload notification from the service server 5, the terminal application activates the video playback button. The terminal application plays the vehicle interior video on the video viewing screen when the activated video playback button is operated.

The terminal application activates the vehicle control button when the vehicle interior video is played. The terminal application instructs the service server 5 to perform vehicle control when the activated vehicle control button is operated. When there are multiple vehicle controls that can be performed, a vehicle control button may be prepared for each type of vehicle control.

<6. Operation>

The operation of the mobility IoT system 1 as a whole will be described with reference to the sequence diagrams of FIGS. 17 and 18.

<6-1. Normal Operation>

Figure 17:
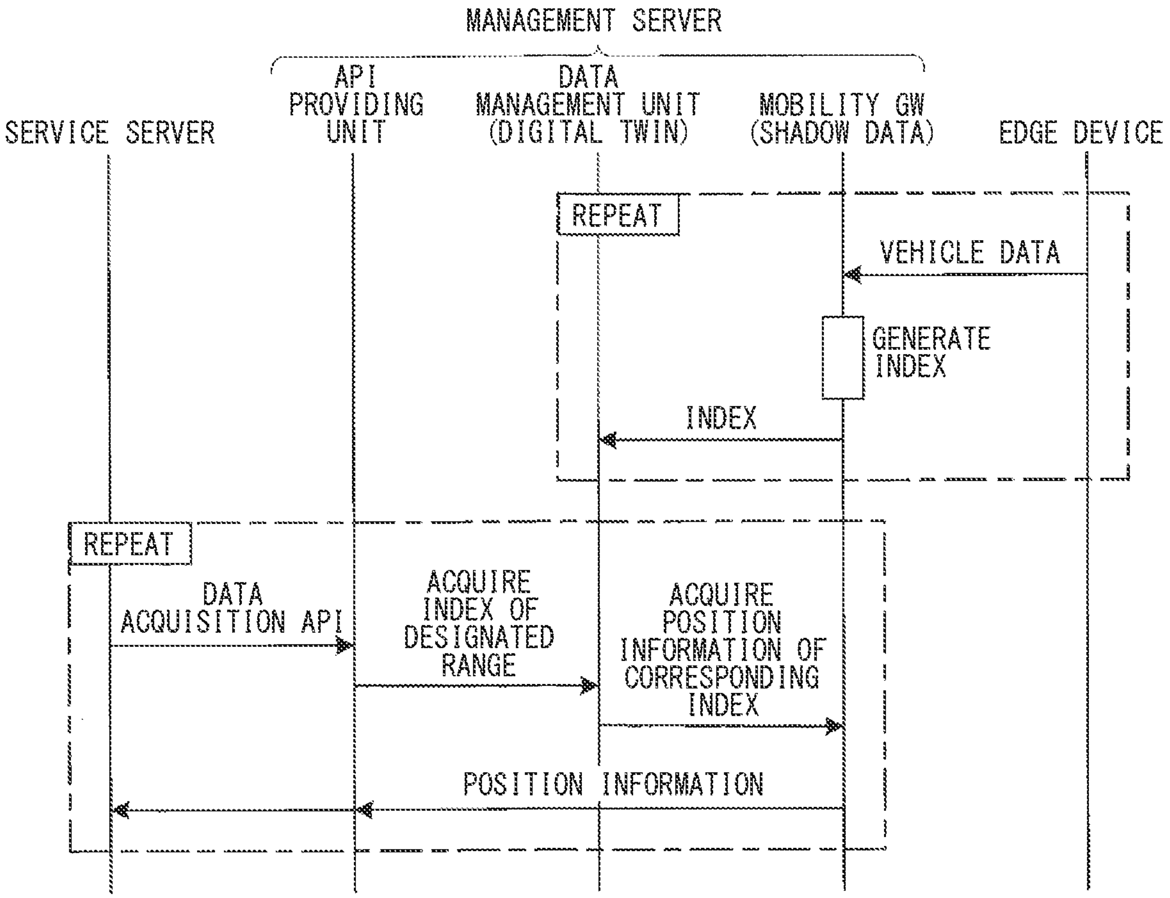
FIG. 17 is a sequence diagram showing an operation of the mobility IoT system in normal times.

As shown in FIG. 17, normally, the edge device 2 repeatedly transmits the vehicle data of the edge-equipped vehicle to the management server 3 according to the schedule.

The mobility GW 111 of the management server 3 accumulates the received vehicle data as the shadow 114 and generates the latest index 118. The data management unit 121 of the management server 3 accumulates the latest index 118 as the digital twin 123. The digital twin 123 includes at least the identification information and position information of all edge-equipped vehicles.

Figure 19:
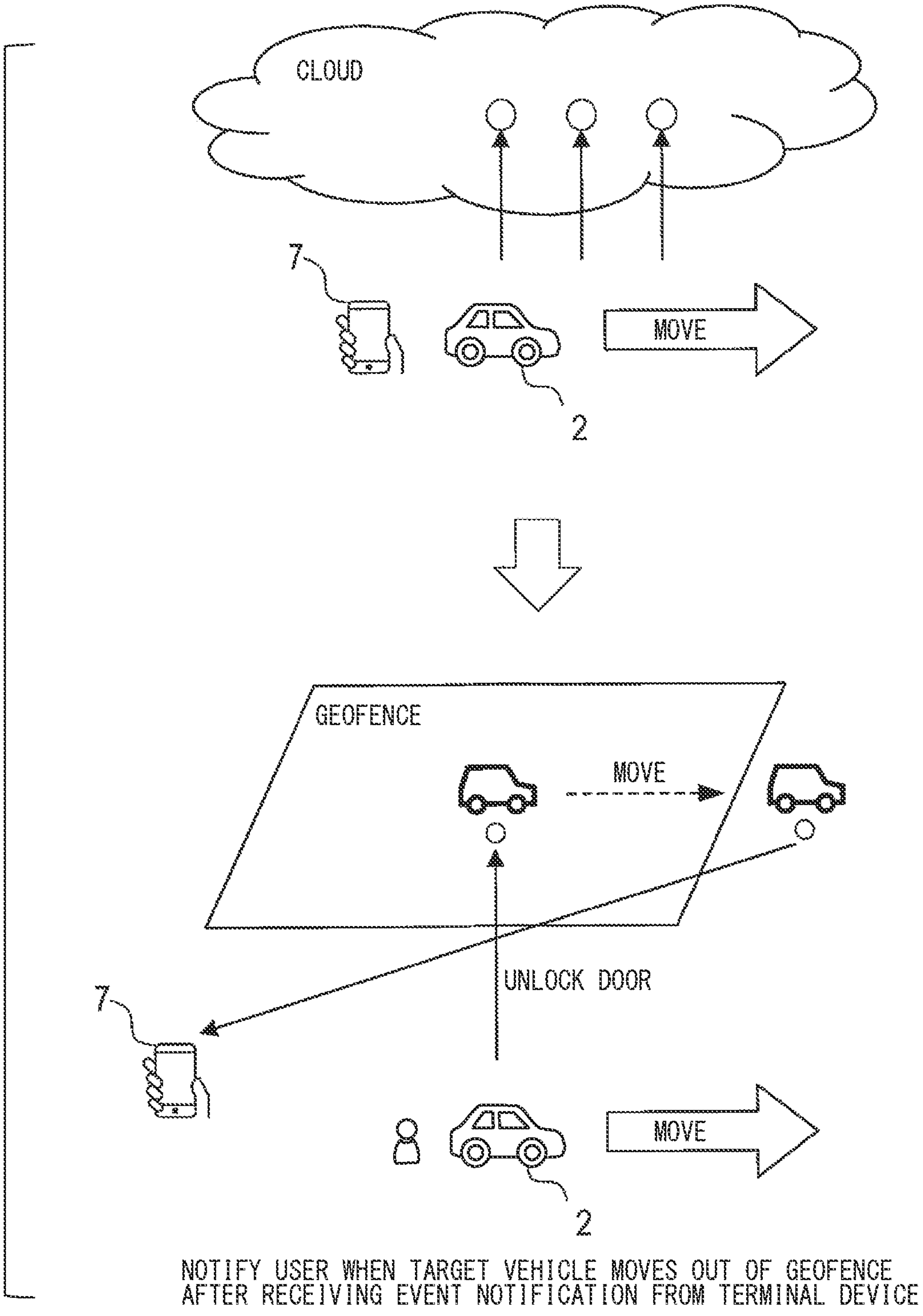
FIG. 19 is an explanatory diagram showing an overview of services provided by the border crossing detection application.

That is, as shown in the upper part of FIG. 19, the vehicle data of all vehicles equipped with the edge device 2 are accumulated in the management server 3 on the cloud while being sequentially updated as the shadow 114 and the digital twin 123.

The data collection unit 61 of the service server 5 uses the data acquisition API 146 provided by the management server 3 to repeatedly acquire the position information of the registered vehicle 8 executing the border crossing detection application A1, and stores the latest position information in the vehicle DB 531.

In the data acquisition request input to the data acquisition API 146, for example, the service provision range is set as position designation information, the current time is set as time designation information, and position information is set as acquisition information. The data management unit 121 generates an object list that designates object IDs and current times of all registered vehicles 8 existing within the designated service range. The mobility GW 111 then extracts the latest position information from the shadow 114 according to the object list and returns it to the service server 5.

<6-2. Operation When Event is Detected>

Figure 18:
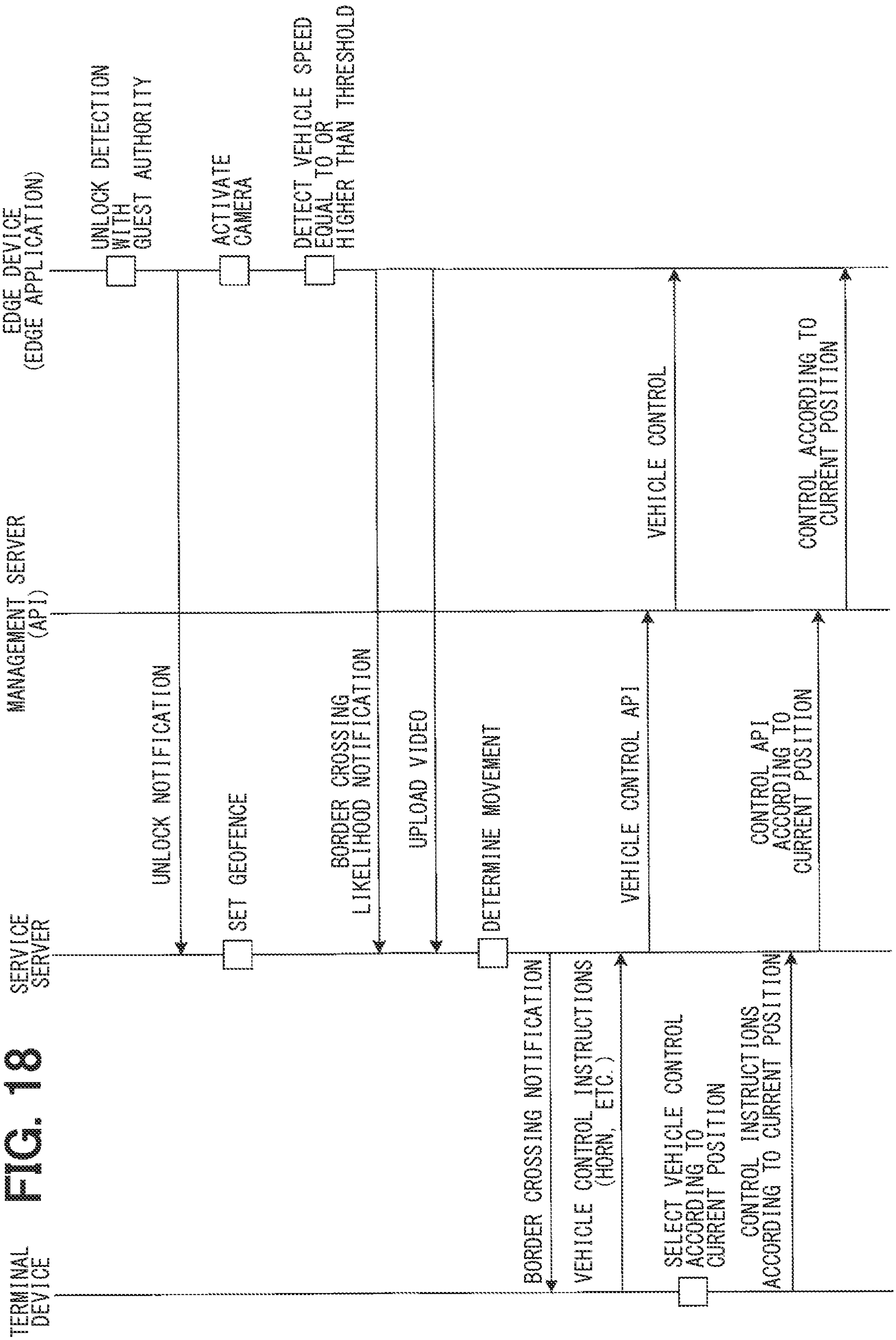
FIG. 18 is a sequence diagram showing an operation of the mobility IoT system when an event is detected in the edge device.

As shown in FIG. 18, when the edge device 2 detects unlocking with the guest authority key, the edge device 2 transmits an unlock notification to the service server 5 and activates the video camera in the vehicle cabin. That is, when someone other than the user (that is, the owner) of the target vehicle unlocks the target vehicle, the video camera starts capturing the vehicle interior.

As shown in the lower part of FIG. 19, the service server 5 sets a geofence including the current position of the target vehicle in response to receiving the unlock notification. For example, the service server 5 sets a rectangular geofence around the current position.

When the edge device 2 detects that the vehicle speed of the target vehicle is equal to or higher than a threshold after detecting the unlocking, the edge device 2 transmits a border crossing likelihood notification to the service server 5 and uploads a video of the vehicle interior to the service server 5.

The service server 5 determines whether or not the current position of the target vehicle has moved out of the geofence in response to receiving the border crossing likelihood notification. That is, the service server 5 generates a geofence in response to receiving the unlock notification, and prepares for performing movement determination of the target vehicle. Then, the service server 5 actually performs movement determination of the target vehicle in response to receiving the border crossing likelihood notification.

When the service server 5 determines that the current position of the target vehicle has moved out of the geofence, the service server 5 transmits a border crossing notification to the terminal device 7 associated with the target vehicle.

The user of the target vehicle receives the border crossing notification via his/her own terminal device 7. When the user receives the border crossing notification, the terminal device 7 instructs the service server 5 to perform predetermined vehicle control. When the service server 5 sets multiple geofences, the user selects vehicle control according to the current position of the target vehicle via the terminal device 7, and instructs the service server 5 to perform the selected vehicle control. Before instructing vehicle control, the user can access the service server 5 from the terminal device 7 and check the vehicle interior video, as necessary.

When receiving a vehicle control instruction from the terminal device 7, the service server 5 accesses the edge device 2 of the target vehicle via the vehicle control API 148 of the management server 3, and causes the target vehicle to perform predetermined vehicle control.

The operation of the service server 5 when an event is detected described above corresponds to the operation when the first example of the event process described above is performed. The operation of the service server 5 when an event is detected may be the operation when the second example of the event process described above is performed.

<7. Effect>

According to the present embodiment described in detail above, the following effects are obtained.

(1) In the first example of the mobility IoT system 1, when a preset event occurs and the target vehicle moves out of the geofence, a border crossing notification is transmitted to the terminal device 7 associated with the target vehicle. Therefore, even when the vehicle is stolen, the user can immediately recognize the occurrence of theft. Therefore, the user's concern about the use of the vehicle by another person can be alleviated.

(2) In the first example, the user can instruct predetermined vehicle control for the target vehicle via the terminal device 7 in response to the user receiving the border crossing notification via the terminal device 7. Therefore, the user's concern about the use of the vehicle by another person can be further alleviated.

(3) In the second example of the mobility IoT system 1, when a preset event occurs and the vehicle moves out of the geofence, the predetermined vehicle control for the registered vehicle 8 is instructed. Therefore, even when the border crossing of the vehicle has occurred, it is less likely that a thief gets away with the vehicle. Therefore, the user's concern about the use of the vehicle by another person can be alleviated.

(4) When the service server 5 changes the shape and/or size of the geofence according to the authority of the user, the owner can limit the movement range of the target vehicle according to the authority granted to the user.

(5) A border crossing likelihood notification is transmitted from the edge device 2 to the service server 5 in response to the vehicle speed of the target vehicle being equal to or higher than the threshold. The service server 5 determines whether or not the target vehicle has moved out of the geofence in response to receiving the border crossing likelihood notification. That is, the service server 5 determines whether or not the border crossing has occurred according to the vehicle speed of the target vehicle being equal to or higher than the threshold. Therefore, erroneous detection of the occurrence of border crossing can be curbed.

Other Embodiments

Although the embodiments of the present disclosure have been described above, the present disclosure is not limited to the embodiments described above, and various modifications can be made to implement the present disclosure.

(a) In the above embodiment, the service server 5 determines whether or not the current position of the target vehicle has moved out of the geofence in response to receiving the unlock notification and the border crossing likelihood notification from the edge device 2. However, the present disclosure is not limited thereto. The service server 5 may set a geofence and determine whether or not the current position of the target vehicle has moved out of the geofence in response to receiving the unlock notification from the edge device 2. In this case, the edge device 2 does not have to determine whether or not the vehicle speed is equal to or higher than the threshold. As a result, the edge device 2 does not have to transmit the border crossing likelihood notification to the service server 5.

(b) In the above embodiment, the edge device 2 detects unlocking with guest authority and activates the video camera in the vehicle cabin, but the video camera may not be activated. That is, the edge device 2 does not have to upload the video of the vehicle interior to the service server 5.

(c) The service server 5 may set a geofence with a fixed shape and size without changing the shape and/or size of the geofence according to the type and/or size of the guest authority.

(d) The control units 21, 31, and 51 and techniques thereof described in the present disclosure may be implemented by a dedicated computer provided by configuring a processor and a memory programmed to execute one or more functions embodied by a computer program. Alternatively, the control units 21, 31, and 51 and techniques thereof described in the present disclosure may be implemented by a dedicated computer provided by configuring the processor with one or more dedicated hardware logic circuits. Alternatively, the control units 21, 31, and 51 and techniques thereof described in the present disclosure may be implemented by one or more dedicated computers configured with a combination of a processor and a memory programmed to execute one or more functions, and a processor configured with one or more hardware logic circuits. The computer programs may also be stored in a computer readable non-transitory tangible recording medium as computer executable instructions. The method of implementing the function of each part included in the control units 21, 31, and 51 does not necessarily include software, and all the functions may be implemented using one or more pieces of hardware.

(e) In addition to the mobility IoT system, management device, and edge device as the information notification system described above, the present disclosure can also be implemented in various forms, such as a program for causing a computer to function as the management device and the edge device, a non-transitory tangible storage medium such as a semiconductor memory recording this program, and an information notification method.

The invention claimed is:

1. An information system, comprising:

a terminal device owned by a user and associated with a registered vehicle;

a management server and a service server; and an edge device having a processor and memory mounted in the registered vehicle, which is registered in the service server; wherein:

the edge device is configured to:

repeatedly collect vehicle data including position information of the registered vehicle and a state of the registered vehicle and provide the vehicle data to the management server; and detect occurrence of a preset event and transmit an event notification indicative of the occurrence of the preset event to the service server;

the management server is configured to store, in association with the registered vehicle, the vehicle data repeatedly provided from the edge device;

the service server is configured to:

acquire the vehicle data stored in the management server;

receive the event notification transmitted from the edge device;

set a geofence including a current position of the registered vehicle in response to receiving the event notification;

change a shape and/or a size of the geofence according to authority given to an occupant of the registered vehicle;

repeatedly identify the current position of the registered vehicle based on the acquired vehicle data;

determine whether the registered vehicle moves out of the set geofence based on the current position of the registered vehicle;

transmit a notification indicating that the registered vehicle has moved out of the geofence to the terminal device associated with the registered vehicle in response to determining that the registered vehicle has moved out of the geofence; and instruct the management server to perform predetermined vehicle control for the registered vehicle upon determining that the registered vehicle has moved out of the geofence;

the terminal device is configured to display an image indicating that the registered vehicle has moved out of the geofence in response to receiving the notification; and the management server is further configured to control the registered vehicle to perform the predetermined vehicle control in response to being instructed to perform the predetermined vehicle control for the registered vehicle by the service server.

2. The information system according to claim 1, wherein: the terminal device is configured to instruct the service server to perform the predetermined vehicle control of the registered vehicle in response to receiving the notification from the service server; and the service server is further configured to instruct the management server to perform the predetermined vehicle control for the registered vehicle determined to be out of the geofence in response to the predetermined vehicle control being instructed by the terminal device.

3. The information system according to claim 1, wherein: the event notification includes a first event notification and a second event notification;

the edge device is further configured to:

transmit the first event notification to the service server in response to detecting the occurrence of the preset event; and transmit the second event notification to the service server in response to a vehicle speed of the registered vehicle increasing to be equal to or higher than a threshold after transmitting the first event notification;

the service server is further configured to set the geofence in response to receiving the first event notification; and the service server is further configured to determine that the registered vehicle has moved out of the geofence in response receiving the second event notification.

4. The information system according to claim 1, wherein the service server is further configured to set a plurality of geofences having different sizes; and the plurality of geofences include a first geofence and a second geofence that is included inside the first geofence.

5. An information system, comprising:

a management server and a service server; and an edge device having a processor and memory mounted in a registered vehicle registered in the service server; wherein:

the edge device is configured to:

repeatedly collect vehicle data including position information of the registered vehicle and a state of the registered vehicle and provide the vehicle data to the management server; and detect occurrence of a preset event and transmit an event notification indicative of the occurrence of the preset event to the service server;

the management server is configured to:

store, in association with the registered vehicle, the vehicle data repeatedly provided from the edge device; and control the registered vehicle to perform instructed vehicle control; and the service server is configured to:

acquire the vehicle data stored in the management server;

receive the event notification transmitted from the edge device;

set a geofence including a current position of the registered vehicle in response to receiving the event notification;

change a shape and/or a size of the geofence according to authority given to an occupant of the registered vehicle;

repeatedly identify the current position of the registered vehicle based on the acquired vehicle data;

determine whether the registered vehicle moves out of the set geofence based on the current position of the registered vehicle; and instruct the management server to perform predetermined vehicle control for the registered vehicle in response to determining that the registered vehicle has moved out of the geofence.

6. A management device, comprising:

a management server; and a service server, wherein:

the management device constitutes an information system together with an edge device having a processor and memory mounted in a registered vehicle registered in the service server;

the management server is configured to store, in association with the registered vehicle, vehicle data including position information repeatedly provided from the edge device;

the service server is configured to:

acquire the vehicle data stored in the management server;

receive an event notification that is indicative of occurrence of a preset event and that is transmitted from the edge device;

set a geofence including a current position of the registered vehicle in response to receiving the event notification;

change a shape and/or size of the geofence according to authority given to an occupant of the registered vehicle;

repeatedly identify the current position of the registered vehicle based on the acquired vehicle data;

determine whether the registered vehicle moves out of the set geofence based on the current position of the registered vehicle;

transmit a notification indicating that the registered vehicle has moved out of the geofence to a terminal device associated with the registered vehicle in response to determining that the registered vehicle has moved out of the geofence; and instruct the management server to perform predetermined vehicle control for the registered vehicle upon determining that the registered vehicle has moved out of the geofence;

the terminal device is configured to display an image indicating that the registered vehicle has moved out of the geofence in response to receiving the notification; and the management server is further configured to control the registered vehicle to perform the predetermined vehicle control in response to being instructed to perform the predetermined vehicle control by the service server.

7. A management device, comprising:

a management server; and a service server; wherein:

the management device constitutes an information system together with an edge device having a processor and memory mounted in a registered vehicle registered in the service server;

the management server is configured to:

store, in association with the registered vehicle, vehicle data including position information repeatedly provided from the edge device; and control the registered vehicle to perform instructed vehicle control, and the service server is configured to:

acquire the vehicle data stored in the management server;

receive an event notification that is indicative of occurrence of a preset event and is transmitted from the edge device;

set a geofence including a current position of the registered vehicle in response to receiving the event notification;

change a shape and/or a size of the geofence according to authority given to an occupant of the registered vehicle;

repeatedly identify the current position of the registered vehicle based on the acquired vehicle data;

determine whether the registered vehicle moves out of the set geofence based on the current position of the registered vehicle; and instruct the management server to perform predetermined vehicle control for the registered vehicle in response to determining that the registered vehicle has moved out of the geofence.

8. An information notification method performed by an information system including a management device and an edge device having a processor and memory, the management device including a management server and a service server, the edge device being mounted in a registered vehicle registered in the service server, the information notification method comprising:

by the edge device, repeatedly collecting vehicle data including position information of the registered vehicle and a state of the registered vehicle and transmitting the vehicle data to the management server;

detecting occurrence of a preset event and transmitting an event notification indicative of the occurrence of the preset event to the service server;

by the management server, storing, in association with the registered vehicle, the vehicle data repeatedly provided from the edge device;

by the service management server, acquiring the vehicle data stored in the management server;

setting a geofence including a current position of the registered vehicle in response to receiving the event notification;

changing a shape and/or a size of the geofence according to authority given to an occupant of the registered vehicle;

repeatedly identifying the current position of the registered vehicle based on the acquired vehicle data;

determining whether the registered vehicle moves out of the set geofence based on the identified current position;

transmitting a notification indicating that the registered vehicle has moved out of the geofence to a terminal device associated with the registered vehicle upon determining that the registered vehicle has moved out of the geofence; and instructing the management server to perform predetermined vehicle control for the registered vehicle upon determining that the registered vehicle has moved out of the geofence;

by the management server, controlling the registered vehicle to perform the predetermined vehicle control in response to being instructed by the service server to perform the predetermined vehicle control;

wherein the terminal device is configured to display an image indicating that the registered vehicle has moved out of the geofence in response to receiving the notification.

9. A vehicle control method performed by an information system including a management device and an edge device having a processor and memory, the management device including a management server and a service server, the edge device being mounted in a registered vehicle registered in the service server, the vehicle control method comprising:

by the edge device, repeatedly collecting vehicle data including position information of the registered vehicle and a state of the registered vehicle and providing the vehicle data to the management server; and detecting occurrence of a preset event and transmitting an event notification indicative of the occurrence of the preset event to the service server;

by the management server, storing, in association with the registered vehicle, the vehicle data repeatedly provided from the edge device;

by the service server, acquiring the vehicle data stored in the management server;

setting a geofence including a current position of the registered vehicle in response to receiving the event notification;

changing a shape and/or a size of the geofence according to authority given to an occupant of the registered vehicle;

repeatedly identifying the current position of the registered vehicle based on the acquired vehicle data;

determining whether the registered vehicle moves out of the set geofence based on the identified current position; and instructing the management server to perform predetermined vehicle control for the registered vehicle upon determining that the registered vehicle has moved out of the geofence; and by the management server, controlling the registered vehicle to perform the predetermined vehicle control in response to being instructed by the service server to perform the predetermined vehicle control.

10. An edge device that constitutes an information system together with a management device including a management server and a service server, the edge device being mounted in a registered vehicle registered in the service server, the edge device having a processor and memory configured to:

repeatedly collect vehicle data including position information of the registered vehicle and a state of the registered vehicle and provide the vehicle data to the management server;

transmit a first event notification to the service server in response to detecting occurrence of a preset event; and transmit a second event notification to the service server in response to a vehicle speed of the registered vehicle increasing to be equal to or higher than a threshold after transmission of the first event notification, wherein:

the service server is configured to:

receive the first event notification transmitted from the edge device;

set a geofence including a current position of the registered vehicle in response to receiving the first event notification;

change a shape and/or a size of the geofence according to authority given to an occupant of the registered vehicle;

transmit a notification indicating that the registered vehicle has moved out of the geofence to a terminal device associated with the registered vehicle in response to determining that the registered vehicle has moved out of the geofence; and instruct the management server to perform predetermined vehicle control for the registered vehicle upon determining that the registered vehicle has moved out of the geofence; and the management server is further configured to control the registered vehicle to perform the predetermined vehicle control in response to being instructed by the service server to perform the predetermined vehicle control.

11. A non-transitory computer readable tangible storage medium storing a program for a processor of an edge device, the edge device constituting an information system together with a management device including a management server and a service server, the edge device being mounted in a registered vehicle registered in the service server, the program, when executed by the processor, causing the processor to:

repeatedly collect vehicle data including position information of the registered vehicle and a state of the registered vehicle and provide the vehicle data to the management server;

transmit a first event notification to the service server in response to detecting occurrence of a preset event; and transmit a second event notification to the service server when a vehicle speed of the registered vehicle increases to be equal to or higher than a threshold after the first event notification was transmitted, wherein:

the service server is configured to:

receive the first event notification transmitted from the edge device;

set a geofence including a current position of the registered vehicle in response to receiving the first event notification;

change a shape and/or a size of the geofence according to authority given to an occupant of the registered vehicle;

transmit a notification indicating that the registered vehicle has moved out of the geofence to a terminal device associated with the registered vehicle in response to determining that the registered vehicle has moved out of the geofence; and instruct the management server to perform predetermined vehicle control for the registered vehicle upon determining that the registered vehicle has moved out of the geofence; and the management server is further configured to control the registered vehicle to perform the predetermined vehicle control in response to being instructed by the service server to perform the predetermined vehicle control.

* * * * *